United States Patent
Huang et al.

(10) Patent No.: US 11,368,944 B2
(45) Date of Patent: Jun. 21, 2022

(54) PARALLEL DUPLICATED UPLINK CONTROL CHANNELS IN UPLINK CARRIER AGGREGATION

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Hwan Joon Kwon, San Diego, CA (US); Krishna Kiran Mukkavilli, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 16/841,557

(22) Filed: Apr. 6, 2020

(65) Prior Publication Data

US 2021/0314937 A1   Oct. 7, 2021

(51) Int. Cl.
*H04W 72/04*     (2009.01)
*H04W 52/04*     (2009.01)
*H04W 72/14*     (2009.01)

(52) U.S. Cl.
CPC ....... *H04W 72/0413* (2013.01); *H04W 52/04* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2012/0250625 A1* | 10/2012 | Kim | H04L 5/0096 370/328 |
| 2013/0039231 A1* | 2/2013 | Wang | H04L 5/001 370/280 |
| 2017/0338912 A1* | 11/2017 | Nigam | H04L 1/1812 |
| 2020/0015229 A1 | 1/2020 | Yang et al. | |
| 2020/0015250 A1* | 1/2020 | Yang | H04L 5/0082 |
| 2021/0144715 A1* | 5/2021 | Gotoh | H04W 72/0493 |

OTHER PUBLICATIONS

International Search Report and Written Opinion—PCT/US2021/025232—ISA/EPO—dated Jun. 23, 2021.

* cited by examiner

*Primary Examiner* — Kodzovi Acolatse
(74) *Attorney, Agent, or Firm* — Qualcomm Incorporated

(57) ABSTRACT

Methods, systems, and devices for wireless communications are described. A user equipment (UE) may receive a downlink transmission via at least one of a primary cell, a secondary cell, or a combination thereof. The UE may identify a feedback indication for the downlink transmission. The UE may transmit a first feedback message that includes the feedback indication via the primary cell. The UE may transmit a second feedback message that also includes the feedback indication via the secondary cell.

30 Claims, 17 Drawing Sheets

PARALLEL DUPLICATED UPLINK CONTROL CHANNELS IN UPLINK CARRIER AGGREGATION

FIELD OF TECHNOLOGY

The following relates generally to wireless communications and more specifically to parallel duplicated uplink control channels in uplink carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support parallel duplicated uplink control channels in uplink carrier aggregation. Generally, the described techniques provide for duplicate hybrid automatic-repeat/request acknowledgment (HARQ-ACK) feedback transmission in parallel on both a primary cell (PCell) and a secondary cell (SCell) in a carrier aggregation scenario. For example, a base station may transmit or otherwise convey a downlink transmission to a user equipment (UE) via the PCell and/or SCell. The UE may identify the feedback indication for the downlink transmission (e.g., acknowledgment/negative-acknowledgment (ACK/NACK) information indicative of whether the UE was able to successfully receive and decode the downlink transmission). The UE may transmit or otherwise convey a first feedback message including the feedback indication to the PCell and a second feedback message including the feedback indication to the SCell. Generally, the first feedback message to the PCell may be considered a primary feedback message transmission and the second feedback message to the SCell may be an optional/supplementary feedback message transmission. In some aspects, the second feedback message to the SCell is to be turned on/off by the network (e.g., via the base station, PCell, and/or SCell). For example, a grant scheduling the downlink transmission for the UE may carry or otherwise convey an indication that multi-cell uplink feedback message transmission has been enabled for the downlink transmission. The supplemental feedback message may be turned on/off based on various factors, such as SCell uplink traffic, UE power headroom, the downlink traffic type (e.g., ultra-reliable/low latency communications (URLLC)), and the like. Accordingly, the described techniques support parallel feedback message transmission to both the PCell and the SCell when the UE is configured for carrier aggregation communications.

A method of wireless communication at a UE is described. The method may include receiving a downlink transmission via at least one of a PCell, a SCell, or a combination thereof, identifying a feedback indication for the downlink transmission, transmitting a first feedback message that includes the feedback indication via the PCell, and transmitting a second feedback message that also includes the feedback indication via the SCell.

An apparatus for wireless communication at a UE is described. The apparatus may include a processor, memory coupled with the processor, and instructions stored in the memory. The instructions may be executable by the processor to cause the apparatus to receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

Another apparatus for wireless communication at a UE is described. The apparatus may include means for receiving a downlink transmission via at least one of a PCell, a SCell, or a combination thereof, identifying a feedback indication for the downlink transmission, transmitting a first feedback message that includes the feedback indication via the PCell, and transmitting a second feedback message that also includes the feedback indication via the SCell.

A non-transitory computer-readable medium storing code for wireless communication at a UE is described. The code may include instructions executable by a processor to receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

Some examples of the method, apparatuses, and non-transitory computer-readable medium described herein may further include operations, features, means, or instructions for receiving a grant scheduling the downlink transmission to the UE, the grant indicating that multi-cell uplink feedback message transmission may be enabled for the downlink transmission.

Some examples of the method, apparatuses, and non-transitory computer-readable medium described herein may further include operations, features, means, or instructions for identifying, based on the grant, that a first resource indication for transmission of the first feedback message and a second resource indication for transmission of the second feedback message may be jointly indicated within the grant as a same resource indication.

In some examples of the method, apparatuses, and non-transitory computer-readable medium described herein, the grant includes a one-bit field to enable or disable the multi-cell uplink feedback message transmission.

In some examples of the method, apparatuses, and non-transitory computer-readable medium described herein, the same resource indication includes at least a slot offset for transmission of the feedback indication relative to reception of the downlink transmission and a transmission resource for transmission of the feedback indication.

Some examples of the method, apparatuses, and non-transitory computer-readable medium described herein may further include operations, features, means, or instructions for identifying, based on the grant, that a first resource indication for transmission of the first feedback message and a second resource indication for transmission of the second feedback message may be independently indicated within the grant as separate resource indications.

In some examples of the method, apparatuses, and non-transitory computer-readable medium described herein, the first resource indication and the second resource indication each include at least a respective slot offset for transmission of the feedback indication relative to reception of the downlink transmission and a respective transmission resource for transmission of the feedback indication.

Some examples of the method, apparatuses, and non-transitory computer-readable medium described herein may further include operations, features, means, or instructions for identifying, based on the grant, a first resource for transmission of the first feedback message and a second resource for transmission of the second feedback message, where the first resource and the second resource may be both for feedback message transmission within a same transmission time interval.

In some examples of the method, apparatuses, and non-transitory computer-readable medium described herein, the same transmission time interval may be a one-symbol feedback transmission time interval.

Some examples of the method, apparatuses, and non-transitory computer-readable medium described herein may further include operations, features, means, or instructions for identifying, based on the grant, a first resource for transmission of the first feedback message and a second resource for transmission of the second feedback message, where the first resource and the second resource may be for feedback message transmission within different transmission time intervals.

Some examples of the method, apparatuses, and non-transitory computer-readable medium described herein may further include operations, features, means, or instructions for receiving a configuration signal configuring a PUCCH group that includes the PCell and the SCell, and identifying, from the configuration signal, that the SCell may be a supplemental PUCCH cell configured for the SCell to receive and the UE to transmit duplicate feedback for the PUCCH group.

In some examples of the method, apparatuses, and non-transitory computer-readable medium described herein, the configuration signal includes a RRC signal.

Some examples of the method, apparatuses, and non-transitory computer-readable medium described herein may further include operations, features, means, or instructions for receiving a transmit power control command, and identifying, based on the transmit power control command, a first power control for transmission of the first feedback message and a second power control for transmission of the second feedback message.

Some examples of the method, apparatuses, and non-transitory computer-readable medium described herein may further include operations, features, means, or instructions for transmitting power indicated by the transmit power control command may be split between the first power control and the second power control in accordance with a default ratio.

Some examples of the method, apparatuses, and non-transitory computer-readable medium described herein may further include operations, features, means, or instructions for transmitting power indicated by the transmit power control command may be split between the first power control and the second power control in accordance with a configuration message received by the UE.

Some examples of the method, apparatuses, and non-transitory computer-readable medium described herein may further include operations, features, means, or instructions for receiving a first transmit power control command indicative of a first transmit power control for transmission of the first feedback message, and receiving a second transmit power control command indicative of a second transmit power control for transmission of the second feedback message, where the first transmit power control command and the second transmit power control command may be separate from each other.

Some examples of the method, apparatuses, and non-transitory computer-readable medium described herein may further include operations, features, means, or instructions for identifying that a first uplink data transmission may be scheduled to overlap in time with one of the transmission of the first feedback message or the transmission of the second feedback message, and adhering to a feedback piggybacking rule in transmission of the first feedback message and transmission of the second feedback message, where the feedback piggybacking rule may be that a supplemental feedback message may be not multiplexed on a same uplink data transmission on which a primary feedback message may be multiplexed.

Some examples of the method, apparatuses, and non-transitory computer-readable medium described herein may further include operations, features, means, or instructions for multiplexing the first feedback message with the first uplink data transmission without multiplexing the second feedback message with the first uplink data transmission.

Some examples of the method, apparatuses, and non-transitory computer-readable medium described herein may further include operations, features, means, or instructions for multiplexing the second feedback message with the first uplink data transmission without multiplexing the first feedback message with the first uplink data transmission.

Some examples of the method, apparatuses, and non-transitory computer-readable medium described herein may further include operations, features, means, or instructions for transmitting the first feedback message on a first component carrier simultaneously with transmitting the second feedback message on a second component carrier, where a first resource indication for the first feedback message may be the same as or different than a second resource indication for the second feedback message.

Some examples of the method, apparatuses, and non-transitory computer-readable medium described herein may further include operations, features, means, or instructions for transmitting the first feedback message on a first component carrier before transmitting the second feedback message on a second component carrier, where a first resource indication for the first feedback message may be the same as or different than a second resource indication for the second feedback message.

A method of wireless communication at a base station is described. The method may include transmitting a downlink transmission to a UE via at least one of a PCell, a SCell, or a combination thereof, receiving, via the PCell, a first feedback message that includes a feedback indication for the downlink transmission, and receiving, via the SCell, a second feedback message from the UE that also includes the feedback indication for the downlink transmission.

An apparatus for wireless communication at a base station is described. The apparatus may include a processor, memory coupled with the processor, and instructions stored in the memory. The instructions may be executable by the processor to cause the apparatus to transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

Another apparatus for wireless communication at a base station is described. The apparatus may include means for transmitting a downlink transmission to a UE via at least one of a PCell, a SCell, or a combination thereof, receiving, via the PCell, a first feedback message that includes a feedback indication for the downlink transmission, and receiving, via the SCell, a second feedback message from the UE that also includes the feedback indication for the downlink transmission.

A non-transitory computer-readable medium storing code for wireless communication at a base station is described. The code may include instructions executable by a processor to transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

Some examples of the method, apparatuses, and non-transitory computer-readable medium described herein may further include operations, features, means, or instructions for transmitting a grant scheduling the downlink transmission to the UE, the grant indicating that multi-cell uplink feedback message transmission may be enabled for the downlink transmission.

Some examples of the method, apparatuses, and non-transitory computer-readable medium described herein may further include operations, features, means, or instructions for configuring the grant to indicate a first resource indication for transmission of the first feedback message and a second resource indication for transmission of the second feedback message, where the first resource indication and second resource indication may be jointly indicated within the grant as a same resource indication.

In some examples of the method, apparatuses, and non-transitory computer-readable medium described herein, the grant includes a one-bit field to enable or disable the multi-cell uplink feedback message transmission.

In some examples of the method, apparatuses, and non-transitory computer-readable medium described herein, the same resource indication includes at least a slot offset for reception of the feedback indication relative to transmission of the downlink transmission and a transmission resource for transmission of the feedback indication from the UE.

Some examples of the method, apparatuses, and non-transitory computer-readable medium described herein may further include operations, features, means, or instructions for configuring the grant to indicate a first resource indication for transmission of the first feedback message and a second resource indication for transmission of the second feedback message, where the first resource indication and second resource indication may be independently indicated within the grant as separate resource indications.

In some examples of the method, apparatuses, and non-transitory computer-readable medium described herein, the first resource indication and the second resource indication each include at least a slot offset for reception of the feedback indication relative to transmission of the downlink transmission and a respective transmission resource for transmission of the feedback indication from the UE.

Some examples of the method, apparatuses, and non-transitory computer-readable medium described herein may further include operations, features, means, or instructions for configuring the grant to indicate a first resource for transmission of the first feedback message and a second resource for transmission of the second feedback message, where the first resource and the second resource may be both for feedback message transmission within a same transmission time interval.

In some examples of the method, apparatuses, and non-transitory computer-readable medium described herein, the same transmission time interval may be a one-symbol feedback transmission time interval.

Some examples of the method, apparatuses, and non-transitory computer-readable medium described herein may further include operations, features, means, or instructions for configuring the grant to indicate a first resource for transmission of the first feedback message and a second resource for transmission of the second feedback message, where the first resource and the second resource may be for feedback message transmission within different transmission time intervals.

Some examples of the method, apparatuses, and non-transitory computer-readable medium described herein may further include operations, features, means, or instructions for transmitting a configuration signal configuring a PUCCH group that includes the PCell and the SCell, where the configuration signal indicates that the SCell may be a supplemental PUCCH cell configured to receive duplicate feedback for the PUCCH group.

In some examples of the method, apparatuses, and non-transitory computer-readable medium described herein, the configuration signal includes a RRC signal.

Some examples of the method, apparatuses, and non-transitory computer-readable medium described herein may further include operations, features, means, or instructions for transmitting a transmit power control command that indicates a first power control for transmission of the first feedback message and a second power control for transmission of the second feedback message.

Some examples of the method, apparatuses, and non-transitory computer-readable medium described herein may further include operations, features, means, or instructions for transmitting power indicated by the transmit power control command may be split between the first power control and the second power control in accordance with a default ratio.

Some examples of the method, apparatuses, and non-transitory computer-readable medium described herein may further include operations, features, means, or instructions for transmitting power indicated by the transmit power control command may be split between the first power control and the second power control in accordance with a configuration message transmitted to the UE.

Some examples of the method, apparatuses, and non-transitory computer-readable medium described herein may further include operations, features, means, or instructions for transmitting a first transmit power control command indicative of a first transmit power control for transmission of the first feedback message, and transmitting a second transmit power control command indicative of a second transmit power control for transmission of the second feedback message, where the first transmit power control command and the second transmit power control command may be separate from each other.

Some examples of the method, apparatuses, and non-transitory computer-readable medium described herein may further include operations, features, means, or instructions for receiving a first uplink data transmission from the UE, where one of the first feedback message or the second feedback message may be received multiplexed with the first uplink data transmission, and where another of the first feedback message or the second feedback message may be received separate from the first uplink data transmission.

Some examples of the method, apparatuses, and non-transitory computer-readable medium described herein may further include operations, features, means, or instructions for receiving the first feedback message on a first component carrier simultaneously with receiving the second feedback message on a second component carrier, where a first resource indication for the first feedback message may be the same as or different than a second resource indication for the second feedback message.

Some examples of the method, apparatuses, and non-transitory computer-readable medium described herein may further include operations, features, means, or instructions for receiving the first feedback message on a first component carrier before receiving the second feedback message on a second component carrier, where a first resource indication for the first feedback message may be the same as or different than a second resource indication for the second feedback message.

DETAILED DESCRIPTION

Figure 1:
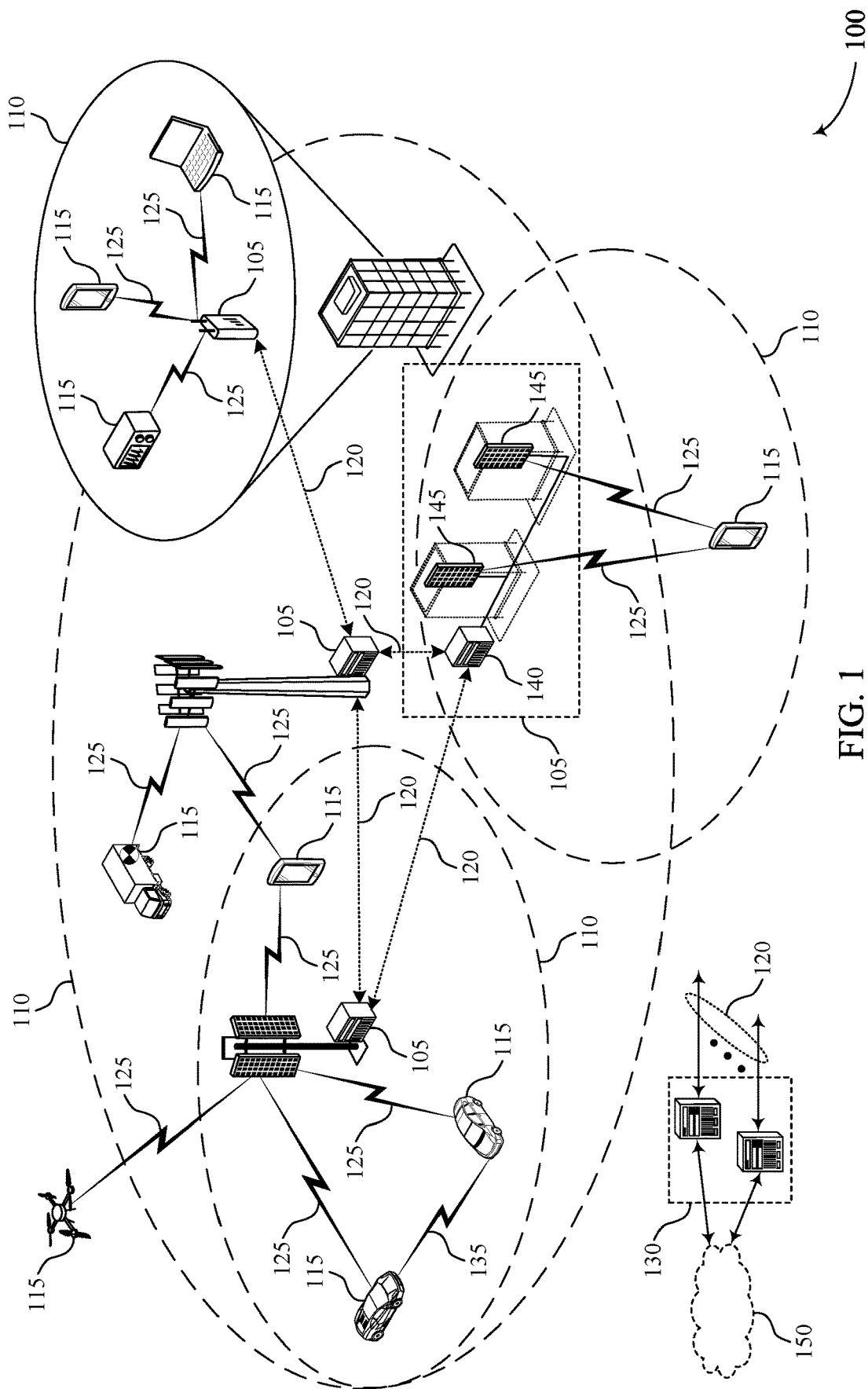
FIG. 1 illustrates an example of a system for wireless communications that supports parallel duplicated uplink control channels in uplink carrier aggregation in accordance with aspects of the present disclosure.

Wireless networks may support carrier aggregation-based communications in the uplink and/or downlink. This may include a user equipment (UE) communicating via a primary cell (PCell) and one or more secondary cells (SCell(s)). The PCell and SCell may be associated with the same base station. For example, the UE may receive a downlink transmission from the PCell and/or SCell over a downlink channel and/or transmit an uplink transmission to the PCell and/or SCell over an uplink channel. One example of such uplink communications may include, but is not limited to, hybrid automatic-repeat/request acknowledgment (HARQ-ACK) communications conveying feedback information over a physical uplink control channel (PUCCH) and/or a physical uplink shared channel (PUSCH). For example, the UE may receive a downlink transmission from the PCell and SCell, identify a feedback indication for the downlink transmission (e.g., determine whether the UE was able to successfully receive and decode the downlink transmission), and then convey the feedback indication to the cell in its configured PUCCH group. Typically, the PUCCH group only includes the PCell such that the feedback message transmission is limited to the PCell (e.g., the UE cannot transmit a feedback message to its SCell). This approach results in reduced reliability for the feedback message, which may disrupt communications between the UE and PCell/SCell.

Aspects of the disclosure are initially described in the context of wireless communications systems. Generally, the described techniques provide for duplicate HARQ-ACK feedback transmission in parallel on both a PCell and a SCell in a carrier aggregation scenario. For example, a base station may transmit or otherwise convey a downlink transmission to a UE via the PCell and/or SCell. The UE may identify the feedback indication for the downlink transmission (e.g., acknowledgment/negative-acknowledgment (ACK/NACK) information indicative of whether the UE was able to successfully receive and decode the downlink transmission). The UE may transmit or otherwise convey a first feedback message including the feedback indication to the PCell and a second feedback message including the feedback indication to the SCell. Generally, the first feedback message to the PCell may be considered a primary feedback message transmission and the second feedback message to the SCell may be an optional/supplementary feedback message transmission. In some aspects, the second feedback message to the SCell is to be turned on/off by the network (e.g., via the base station, PCell, and/or SCell). For example, a grant scheduling the downlink transmission for the UE may carry or otherwise convey an indication that multi-cell uplink feedback message transmission has been enabled for the downlink transmission. The supplemental feedback message may be turned on/off based on various factors, such as SCell uplink traffic, UE power headroom, the downlink traffic type (e.g., ultra-reliable/low latency communications (URLLC)), and the like. Accordingly, the described techniques support parallel feedback message transmission to both the PCell and the SCell when the UE is configured for carrier aggregation communications.

Aspects of the disclosure are further illustrated by and described with reference to apparatus diagrams, system diagrams, and flowcharts that relate to parallel duplicated uplink control channels in uplink carrier aggregation.

FIG. 1 illustrates an example of a wireless communications system 100 that supports parallel duplicated uplink control channels in uplink carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a downlink transmission via at least one of a primary cell, a secondary cell, or a combination thereof. The UE 115 may identify a feedback indication for the downlink transmission. The UE 115 may transmit a first feedback message that includes the feedback indication via the primary cell. The UE 115 may transmit a second feedback message that also includes the feedback indication via the secondary cell.

A base station 105 (e.g., when configured as, or otherwise a part of a primary cell and/or secondary cell) may transmit a downlink transmission to a UE 115 via at least one of a primary cell, a secondary cell, or a combination thereof. The base station 105 may receive, via the primary cell, a first feedback message that includes a feedback indication for the downlink transmission. The base station 105 may receive, via the secondary cell, a second feedback message from the UE 115 that also includes the feedback indication for the downlink transmission.

Figure 2A:
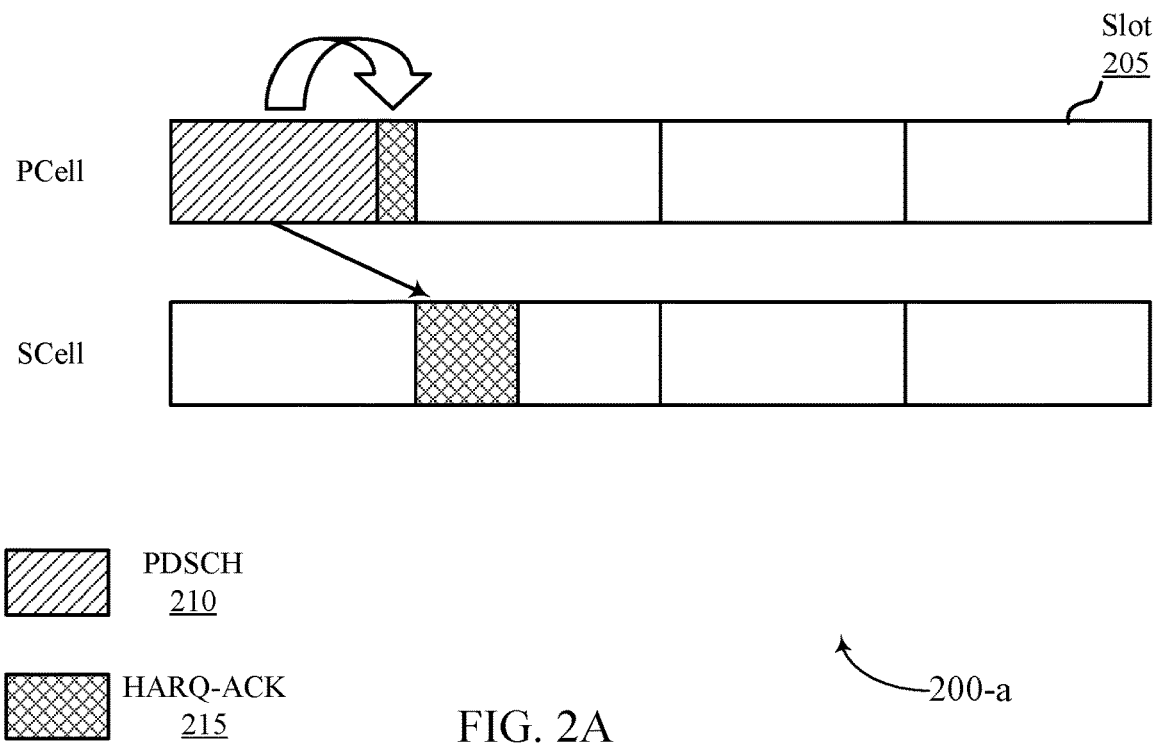
FIGS. 2A and 2B illustrate examples of a feedback configuration that supports parallel duplicated uplink control channels in uplink carrier aggregation in accordance with aspects of the present disclosure.
Figure 2B:
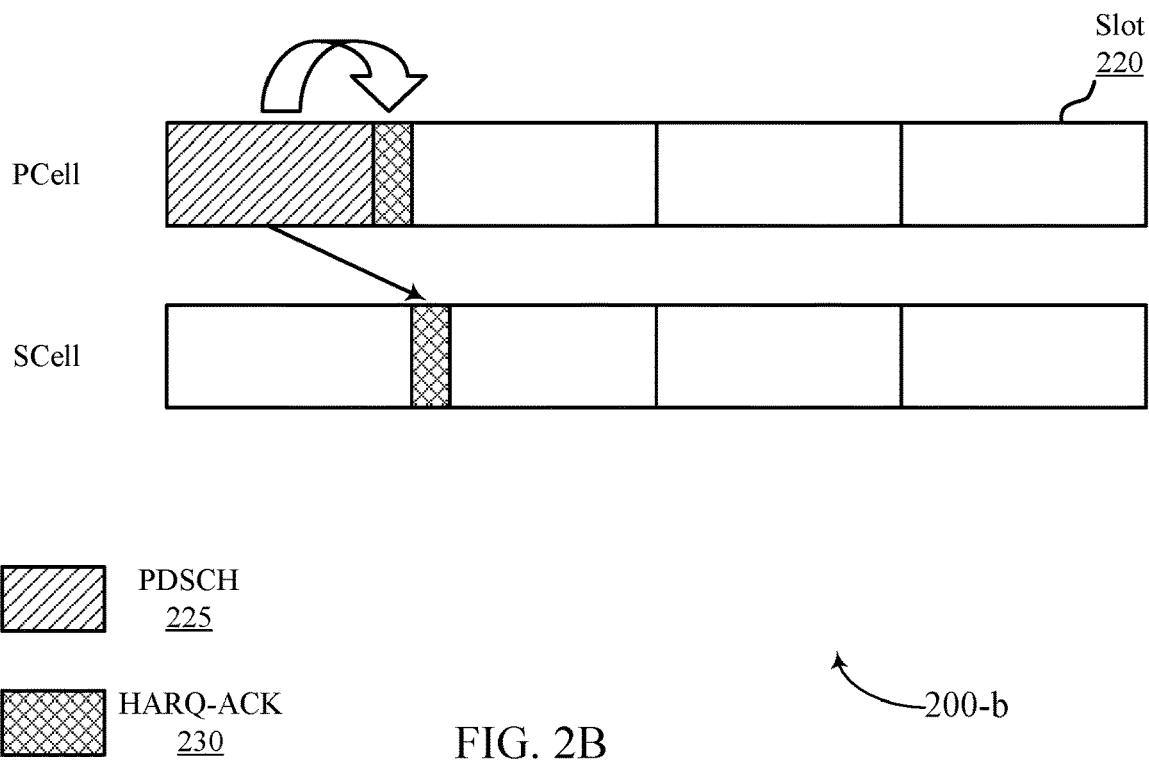

FIGS. 2A and 2B illustrate examples of a feedback configuration 200 that supports parallel duplicated uplink control channels in uplink carrier aggregation in accordance with aspects of the present disclosure. In some examples, feedback configuration 200 may implement aspects of wireless communication system 100. Aspects of feedback configuration 200 may be implemented by a base station (e.g., one or more base stations associated with a PCell and/or SCell) and/or a UE, which may be examples of corresponding devices described herein. In some aspects, the base station and UE may be performing communications using carrier aggregation techniques. Generally, feedback configuration 200-a of FIG. 2a illustrates an example where frequency hopping is performed across two component carriers that do not overlap in the time domain, but use different PUCCH lengths for the first feedback message and the second feedback message. Feedback configuration 200-b of FIG. 2B illustrates an example where frequency hopping is performed across two component carriers that do not overlap in the time domain, but use the same PUCCH length for the first feedback message and the second feedback message.

Wireless networks may support carrier aggregation-based communications in the uplink and/or downlink. This may include the UE communicating via a PCell and one or more SCell(s). For example, the UE may receive a downlink transmission from the PCell and/or SCell over a downlink channel (e.g., PDCCH/PDSCH) and/or transmit an uplink transmission to the PCell and/or SCell over an uplink channel (e.g., PUCCH/PUSCH). One example of such uplink communications may include, but is not limited to, HARQ-ACK communications conveying feedback information over PUCCH and/or PUSCH. For example, the UE may receive a downlink transmission from the PCell and SCell, identify a feedback indication for the downlink transmission (e.g., determine whether the UE was able to successfully receive and decode the downlink transmission), and then convey the feedback indication to the cell in its configured PUCCH group (e.g., the PCell). Typically, the PUCCH group only includes the PCell such that the feedback message transmission is limited to the PCell (e.g., the UE cannot transmit a feedback message to its SCell). This approach results in reduced reliability for the feedback message, which may disrupt communications between the UE and PCell/SCell.

Accordingly, the described techniques provide for duplicate HARQ-ACK feedback transmission in parallel on both a PCell and a SCell in a carrier aggregation scenario. For example, the base station may transmit or otherwise convey a downlink transmission (e.g., PDSCH 210/225) to the UE via the PCell and/or SCell (e.g., the PCell and SCell may be associated with the same base station or with different base stations). The downlink transmission may be received in one or more slots 205/220, with only one slot 205/225 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 215/230 during the first slot 205/220, in which slot 205 is the same slot in which the downlink transmission was received) including the feedback indication to the PCell and a second feedback message (e.g., HARQ-ACK 215/230 during the second slot 220, which is the slot 220 after the downlink transmission was received) including the feedback indication to the SCell.

Generally, the first feedback message to the PCell may be considered a primary feedback message transmission and the second feedback message to the SCell may be an optional/supplementary feedback message transmission. For example, the UE may be configured with a PUCCH group, e.g., via an RRC configuration signal that configures the PUCCH group for the UE. The base station may configure the SCell in the same PUCCH group as a supplemental PUCCH cell. This may enable the UE to provide supplementary and simultaneous HARQ-ACK transmission to the SCell, e.g., the UE may include the SCell in its feedback message transmissions.

In some aspects, the second feedback message to the SCell to be turned on/off by the network (e.g., via the base station, PCell, and/or SCell). For example, a grant scheduling the downlink transmission for the UE (e.g., a downlink control information (DCI) grant) may carry or otherwise convey an indication that multi-cell uplink feedback message transmission has been enabled for the downlink transmission. The supplemental feedback message (e.g., the second feedback message to the SCell) may be turned on/off based on various factors considered by the base station, such as SCell uplink traffic, UE power headroom, downlink transmission traffic type (e.g., URLLC), and the like.

In some aspects, the grant may also convey additional information that can be used for transmission of the feedback messages from the UE. In one example, the base station may guarantee that a certain PUCCH resource configuration is available for the PCell and the supplemental PUCCH SCell (e.g., the SCell receiving the second feedback message). That is, the grant may convey the same PUCCH resource indicator and K−1 values to be used for the first feedback message transmission to the PCell and the second feedback message transmission to the SCell. In one example, this may include one bit, field, parameter, etc., in the grant that is used to enable/disable the supplementary ACK/NACK feedback for the UE. Accordingly, the UE may identify, from the grant, a first resource indication for transmission of the first feedback message and a second resource indication for transmission of the second feedback message are jointly indicated within the grant as a same resource indication. Examples of the same resource indication may include, but are not limited to, the slot offset for transmission of the feedback indication relative to reception of the downlink transmission (e.g., the K1 value) and a transmission resource for transmission of the feedback indication (e.g., time, frequency, spatial, code, etc., resources for transmission of the feedback messages).

In another option, the grant may provide separate PUCCH resource indications for the PCell and supplemental PUCCH cell (e.g., the SCell). For example, a new bit, field, parameter, etc., in the downlink grant may indicate PUCCH and/or K1 values separately for the primary ACK/NACK feedback (e.g., to the PCell) and the supplemental ACK/NACK feedback (e.g., to the SCell). Accordingly, the UE may identify a first resource indication for transmission of the first feedback message and a second resource indication for transmission of the second feedback message are independently indicated within the grant as separate resource indications. Examples of the separately or independently indicated resource indications include, but are not limited to, the slot offset for transmission of the feedback indication relative to reception of the downlink transmission (e.g., K1 values), a respective transmission resource for transmission of the feedback indication (e.g., a separate transmission resource for transmission of the first feedback message and the second feedback message).

In some aspects, the grant may also indicate that the first resource indication for transmission of the first feedback message and a second resource indication for transmission of the second feedback message are both a feedback message transmission within a same transmission time interval (e.g., a one-symbol feedback transmission time interval, a one-slot feedback transmission time interval, etc.). In another example, the grant may indicate that the first resource indication for transmission of the first feedback message and the second resource indication for transmission of the second feedback message are for a feedback message transmission within different transmission time intervals (e.g., different symbol feedback transmission time intervals, different slots feedback transmission time intervals, and the like).

In some aspects, power control for feedback message transmission may be signaled or otherwise configured by the base station. In one example, no new power control command may be provided for the supplementary ACK/NACK feedback. Instead, primary and supplementary ACK/NACK feedback message transmission may split power semi-statically (e.g., half/half or follow an RRC configuration). In some aspects, the network may disable the supplementary ACK/NACK feedback transmission if it expects the SCell to experience a large path loss/deep fading based on the power headroom. For example, base station may transmit a power control command to the UE, which identifies the first power control for transmission of the first feedback message and a second power control for transmission of the second feedback message. In some examples, the transmit power indicated by the transmit power control command may be split between the first power control and the second power control in accordance with the default ratio (e.g., half/half). In other examples, the transmit power indicated by the transmit power control command may be split between the first power control and the second power control in accordance with the configuration message received by the UE (e.g., an RRC configuration message).

In another example, the base station may configure the UE with separate power control commands for the supplementary ACK/NACK feedback message transmission (e.g., transmission of the second feedback message). For example, the base station may transmit a first power control command indicative of a first transmit power control for transmission of the first feedback message and transmit a second transmit power control command indicative of a second transmit power control for transmission of the second feedback message. The first transmit power control command and the second transmit power control command may be separate from each other.

In some aspects, the supplementary ACK/NACK feedback message to the SCell may be multiplexed on the same PUSCH resource as the primary ACK/NACK feedback message to the PCell. That is, the first feedback message may be transmitted in the same PUSCH resource as the second feedback message. In this situation, the second feedback message to the SCell may be dropped if it is multiplexed on the same PUSCH resource as the first feedback message. For example, the UE may identify that a first uplink data transmission (e.g., PUSCH) is scheduled to overlap in time with transmission of the first feedback message and/or the second feedback message. Accordingly, the UE may adhere to a feedback piggybacking rule in transmission of the first feedback message and transmission of the second feedback message. The feedback piggybacking rule may be that a supplemental ACK/NACK feedback message (e.g., the second feedback message) is not multiplexed on the same uplink data transmission on which the primary feedback message (e.g., the first feedback message) is multiplexed. If the first uplink data transmission (e.g., PUSCH) overlaps in time with transmission of the first feedback message, but not with transmission of the second feedback message, the feedback piggybacking rule may include multiplexing the first feedback message with the first uplink data transmission, but without multiplexing the second feedback message with the first uplink data transmission. If the first uplink data transmission overlaps in time with transmission of the second feedback message, but not with the first feedback message, the feedback piggybacking rule may include multiplexing the second feedback message with the first uplink data transmission, but without multiplexing the first feedback message with the first uplink data transmission.

As discussed above, feedback configuration 200-a of FIG. 2a illustrates an example where frequency hopping is performed across two component carriers that do not overlap in the time domain, but use different PUCCH lengths for the first feedback message and the second feedback message. That is, feedback configuration 200-a of FIG. 2A illustrates an example where frequency hopping is performed such that the first and second feedback messages are transmitted to the PCell and SCell, respectively, using different component carriers. Moreover, the first and feedback messages are transmitted at different times, e.g., not simultaneously transmitted. Moreover, the PUCCH length for the first feedback message is different than the PUCCH length for the second feedback message, e.g., in the time/frequency domain.

As also discussed above, feedback configuration 200-b of FIG. 2B illustrates an example where frequency hopping is performed across two component carriers that do not overlap in the time domain, but use the same PUCCH length for the first feedback message and the second feedback message. That is, feedback configuration 200-b of FIG. 2B illustrates an example where frequency hopping is performed such that the first and second feedback messages are transmitted to the PCell and SCell, respectively, using different component carriers. Moreover, the first and feedback messages are transmitted at different times, e.g., not simultaneously transmitted. However, feedback configuration 200-b of FIG. 2B illustrates an example where the PUCCH length for the first feedback message is the same as the PUCCH length for the second feedback message, e.g., in the time/frequency domain.

Figure 3A:
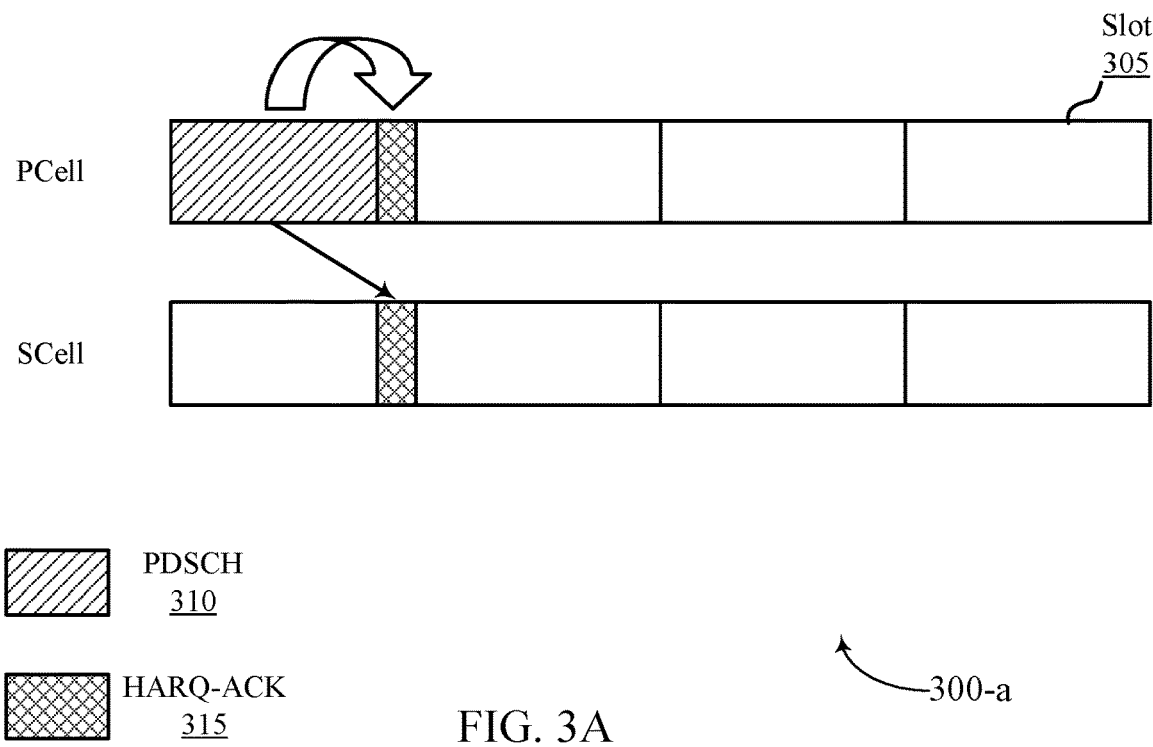
FIGS. 3A and 3B illustrate examples of a feedback configuration that supports parallel duplicated uplink control channels in uplink carrier aggregation in accordance with aspects of the present disclosure.
Figure 3B:
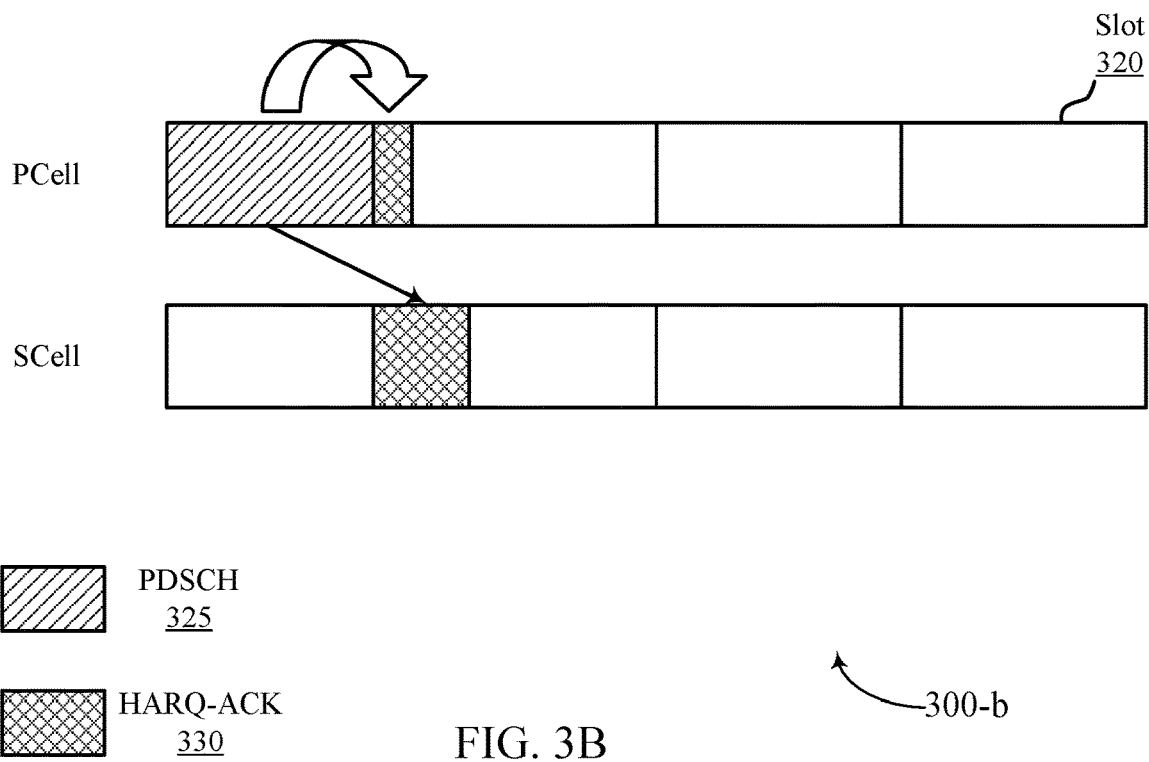

FIGS. 3A and 3B illustrate examples of a feedback configuration 300 that supports parallel duplicated uplink control channels in uplink carrier aggregation in accordance with aspects of the present disclosure. In some examples, feedback configuration 300 may implement aspects of wireless communication system 100 and/or feedback configuration 200. Aspects of feedback configuration 300 may be implemented by a base station (e.g., one or more base stations associated with a PCell and/or SCell) and/or a UE, which may be examples of corresponding devices described herein. In some aspects, the base station and UE may be performing communications using carrier aggregation techniques. Generally, feedback configuration 300-a of FIG. 3a illustrates an example where frequency hopping is performed across two component carriers that overlap in the time domain, and use the same PUCCH lengths for the first feedback message and the second feedback message. Feedback configuration 300-b of FIG. 3B illustrates an example where frequency hopping is performed across two component carriers that overlap in the time domain, but use different PUCCH lengths for the first feedback message and the second feedback message.

As discussed above, the described techniques provide for duplicate HARQ-ACK feedback transmission in parallel on both a PCell and a SCell in a carrier aggregation scenario. For example, the base station may transmit or otherwise convey a downlink transmission (e.g., PDSCH 310/325) to the UE via the PCell and/or SCell (e.g., the PCell and SCell may be associated with the same base station or with different base stations). The downlink transmission may be received in one or more slots 305/320, with one slot 305/320 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 315/330 during the first slot 305/320, which is also the slot 305/320 in which the downlink transmission was received) including the feedback indication to the PCell and a second feedback message (e.g., HARQ-ACK 315/330 also during the first slot 305, which is also the slot 305/320 that the downlink transmission was received) including the feedback indication to the SCell.

In some aspects, this may be based on the self-contained slot structure for the first slot 305 having only one symbol configured as either flexible (F) or uplink (U). That is, the first slot 305 may span 14 symbols (or some other number of symbols), with the slot structure being configured as DDDDDDDDDDDDDF, where D stands for a symbol configured for downlink (although the described techniques may also work with the last symbols configured as an U symbol). Simultaneous and duplicate transmission of the ACK/NACK feedback message (e.g., the first and second feedback messages conveying the feedback indication) to the PCell and SCell may support frequency hopping for the one-symbol ACK/NACK feedback.

As also discussed, the UE may be configured with a PUCCH group, e.g., via an RRC configuration signal that configures the PUCCH group for the UE. The base station may configure the SCell in the same PUCCH group as a supplemental PUCCH cell. The second feedback message to the SCell to be turned on/off by the network (e.g., via the base station, PCell, and/or SCell) by the grant scheduling the downlink transmission. The grant may also convey additional information that can be used for transmission of the feedback messages from the UE, e.g., in the same or separate resource indications. The grant may also indicate the transmission timer interval information for transmission of the first and second feedback messages.

Power control for feedback message transmission may be signaled or otherwise configured by the base station, e.g., using power control for the PCell feedback message transmission for the SCell feedback message transmission. In another example, the base station may configure the UE with separate power control commands for the supplementary ACK/NACK feedback message transmission (e.g., transmission of the second feedback message). Also, a feedback piggybacking rule may be applied depending on the overlap between a PUSCH transmission and the first and/or second feedback message transmission.

As discussed above, feedback configuration 300-*a* of FIG. 3*a* illustrates an example where frequency hopping is performed across two component carriers that overlap in the time domain, and use the same PUCCH length for the first feedback message and the second feedback message. That is, feedback configuration 300-*a* of FIG. 3A illustrates an example where frequency hopping is performed such that the first and second feedback messages are transmitted to the PCell and SCell, respectively, using different component carriers. Moreover, the first and feedback messages are transmitted at the same time, e.g., simultaneously transmitted. Moreover, the PUCCH length for the first feedback message is the same as the PUCCH length for the second feedback message, e.g., in the time/frequency domain.

As also discussed above, feedback configuration 300-*b* of FIG. 3B illustrates an example where frequency hopping is performed across two component carriers that overlap in the time domain, but use different PUCCH lengths for the first feedback message and the second feedback message. That is, feedback configuration 300-*b* of FIG. 3B illustrates an example where frequency hopping is performed such that the first and second feedback messages are transmitted to the PCell and SCell, respectively, using different component carriers. Moreover, the first and feedback messages are transmitted at the same time, e.g., simultaneously transmitted. However, feedback configuration 300-*b* of FIG. 3B illustrates an example where the PUCCH length for the first feedback message is different than the PUCCH length for the second feedback message, e.g., in the time/frequency domain.

Figure 4A:
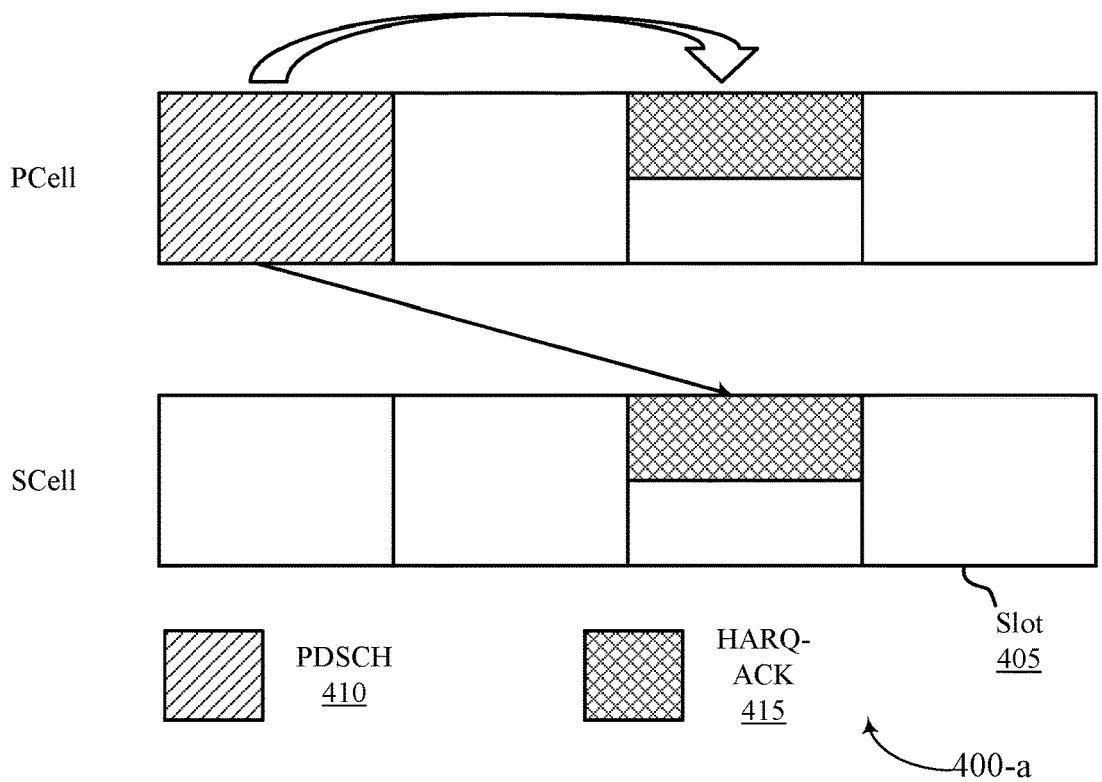
FIGS. 4A and 4B illustrate examples of a feedback configuration that supports parallel duplicated uplink control channels in uplink carrier aggregation in accordance with aspects of the present disclosure.
Figure 4B:
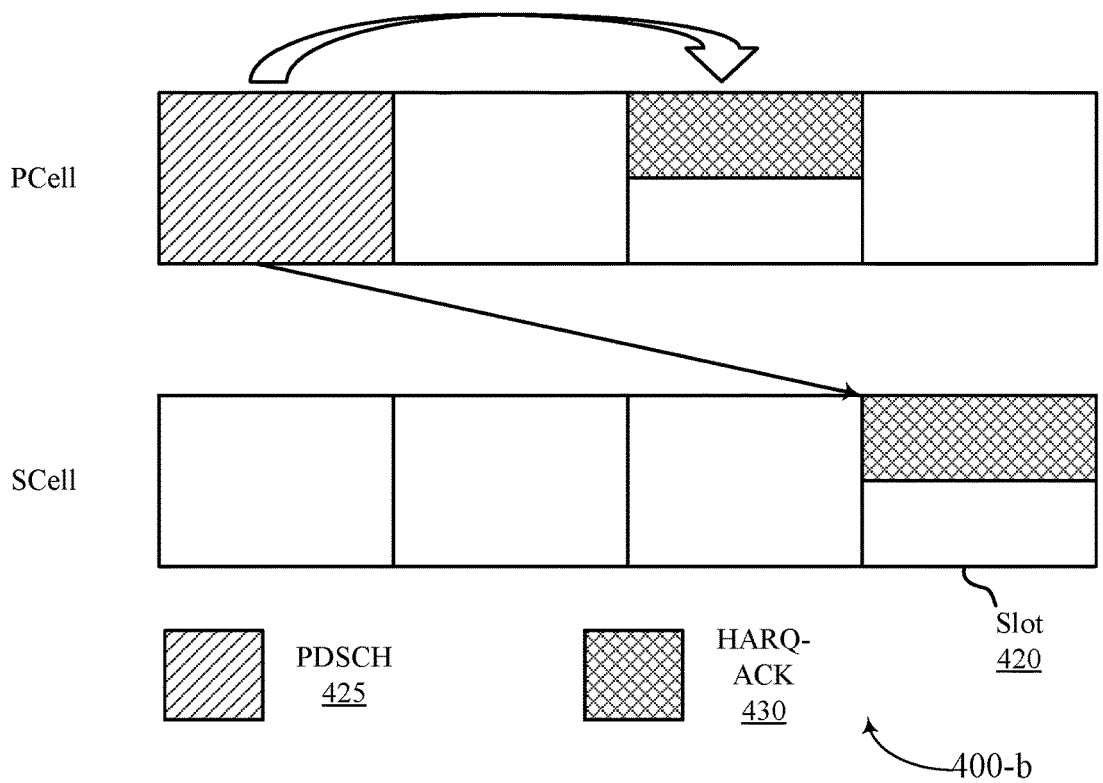

FIGS. 4A and 4B illustrate examples of a feedback configuration 400 that supports parallel duplicated uplink control channels in uplink carrier aggregation in accordance with aspects of the present disclosure. In some examples, feedback configuration 400 may implement aspects of wireless communication system 100 and/or feedback configurations 200 and/or 300. Aspects of feedback configuration 400 may be implemented by a base station (e.g., one or more base stations associated with a PCell and/or SCell) and/or a UE, which may be examples of corresponding devices described herein. In some aspects, the base station and UE may be performing communications using carrier aggregation techniques. Broadly, feedback configuration 400-*a* of FIG. 4A illustrates an example where the first and second feedback messages are transmitted during the same slot and feedback configuration 400-*b* of FIG. 4B illustrates an example where the first and second feedback messages are transmitted during different slots.

In some situations, the UE may be a reduced capability UE (e.g., a NR-Light UE) with carrier aggregation capability. However, each component carrier may be relatively narrow (e.g., 5 MHz). Feedback configuration 400 illustrates an example where parallel HARQ-ACK feedback or HARQ-ACK feedback with frequency hopping across component carriers increases the frequency diversity. That is, feedback configuration 400 support frequency hopping being enabled to achieve frequency diversity.

For example and with reference to feedback configuration 400-*a* of FIG. 4A, the base station may transmit or otherwise convey a downlink transmission (e.g., PDSCH 410) to the UE via the PCell and/or SCell (e.g., the PCell and SCell may be associated with the same base station or with different base stations). The downlink transmission may be received in one or more slots 405, with one slot 405 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 415 during the third slot 405, which is two slots 405 after the downlink transmission was received and based on the K1 value) including the feedback indication to the PCell and a second feedback message (e.g., HARQ-ACK 415 also during the third slot 405, which is also two slots 405 after the downlink transmission was received and based on the K1 value) including the feedback indication to the SCell.

As another example and with reference to feedback configuration 400-*b* of FIG. 4B, the base station may transmit or otherwise convey a downlink transmission (e.g., PDSCH 425) to the UE via the PCell and/or SCell (e.g., the PCell and SCell may be associated with the same base station or with different base stations). The downlink transmission may be received in one or more slots 420, with one slot 420 being labeled for ease of reference. The UE may identify the feedback indication for the downlink transmission (e.g., ACK/NACK information indicative of whether the UE was able to successfully receive and decode the downlink transmission). The UE may transmit or otherwise convey a first feedback message (e.g., HARQ-ACK 430 during the third slot 420, which is two slots 420 after the downlink transmission was received and based on the K1 value) including the feedback indication to the PCell and a second feedback message (e.g., HARQ-ACK 430 during the fourth slot 420, which is three slots 420 after the downlink transmission was received) including the feedback indication to the SCell. The first and second feedback messages may be transmitted on separate component carriers to achieve frequency hopping/diversity.

As also discussed, the UE may be configured with a PUCCH group, e.g., via an RRC configuration signal that configures the PUCCH group for the UE. The base station may configure the SCell in the same PUCCH group as a supplemental PUCCH cell. The second feedback message to the SCell to be turned on/off by the network (e.g., via the base station, PCell, and/or SCell) by the grant scheduling the downlink transmission. The grant may also convey additional information that can be used for transmission of the feedback messages from the UE, e.g., in the same or separate resource indications. The grant may also indicate the transmission timer interval information for transmission of the first and second feedback messages.

Power control for feedback message transmission may be signaled or otherwise configured by the base station, e.g., using power control for the PCell feedback message transmission for the SCell feedback message transmission. In another example, the base station may configure the UE with separate power control commands for the supplementary ACK/NACK feedback message transmission (e.g., transmission of the second feedback message). Also, a feedback piggybacking rule may be applied depending on the overlap between a PUSCH transmission and the first and/or second feedback message transmission.

Figure 5:
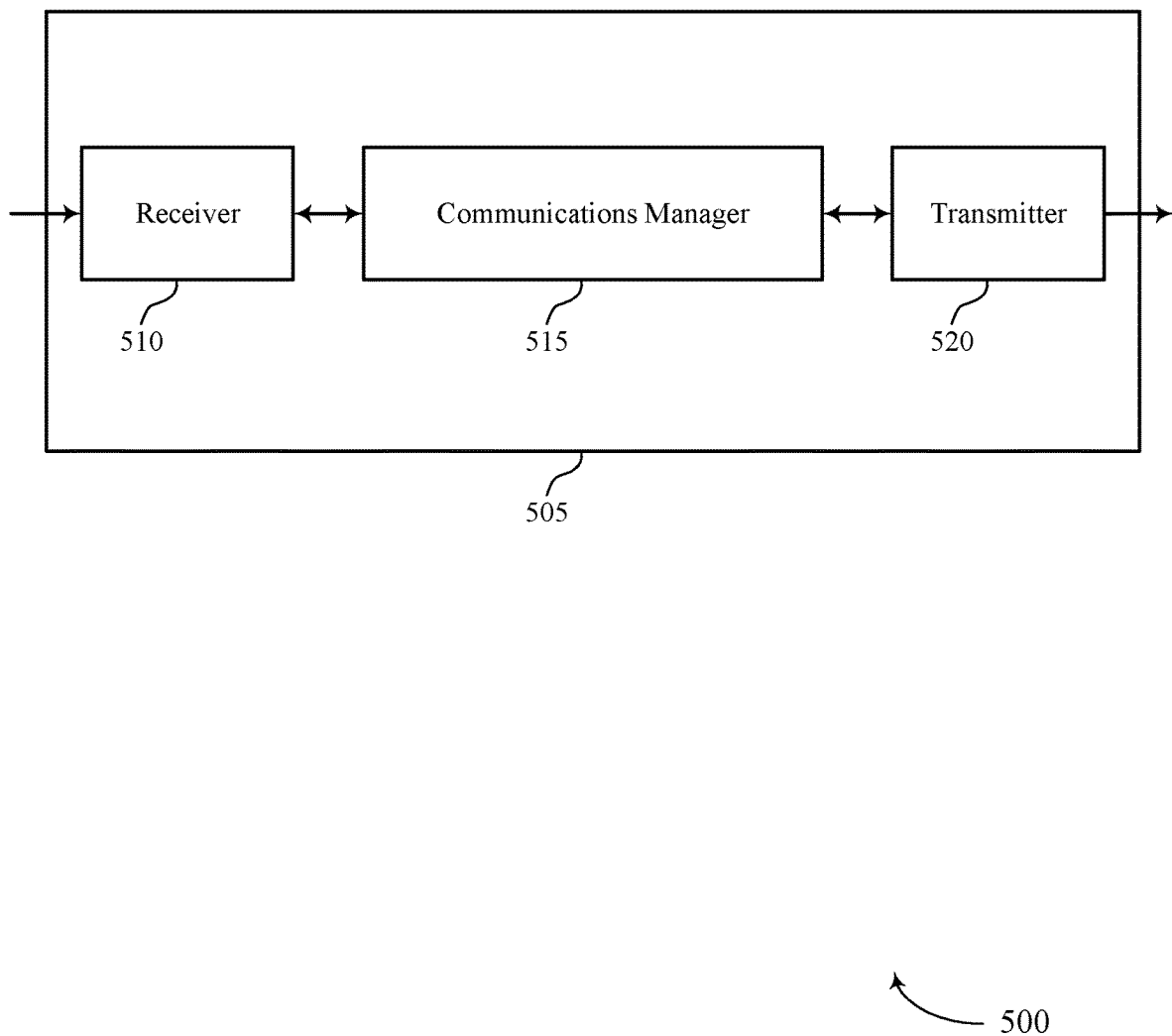
FIGS. 5 and 6 show block diagrams of devices that support parallel duplicated uplink control channels in uplink carrier aggregation in accordance with aspects of the present disclosure.

FIG. 5 shows a block diagram 500 of a device 505 that supports parallel duplicated uplink control channels in uplink carrier aggregation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to parallel duplicated uplink control channels in uplink carrier aggregation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
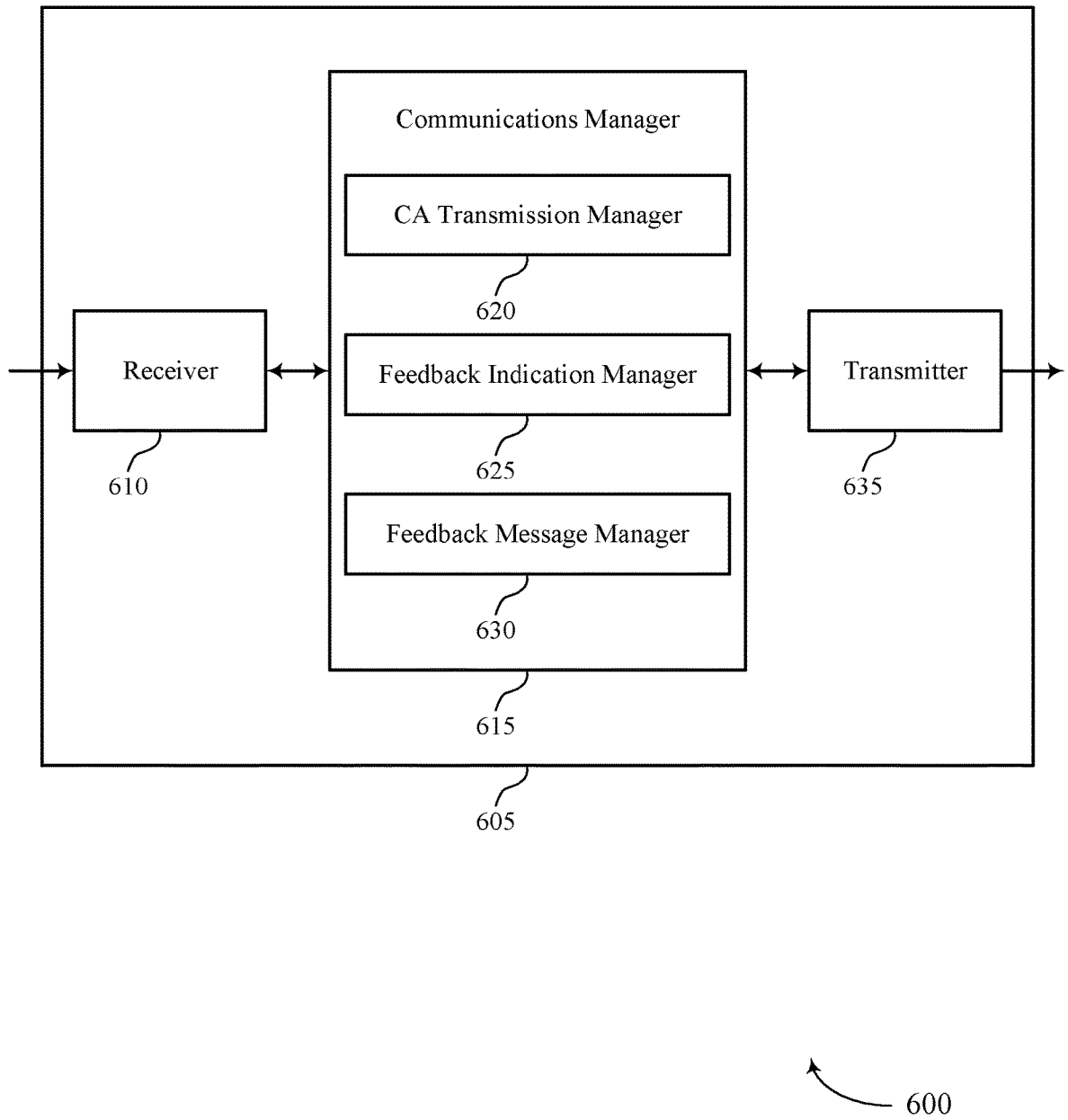

FIG. 6 shows a block diagram 600 of a device 605 that supports parallel duplicated uplink control channels in uplink carrier aggregation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to parallel duplicated uplink control channels in uplink carrier aggregation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CA transmission manager 620, a feedback indication manager 625, and a feedback message manager 630. The communications manager 615 may be an example of aspects of the communications manager 810 described herein.

The CA transmission manager 620 may receive a downlink transmission via at least one of a PCell, a SCell, or a combination thereof.

The feedback indication manager 625 may identify a feedback indication for the downlink transmission.

The feedback message manager 630 may transmit a first feedback message that includes the feedback indication via the PCell and transmit a second feedback message that also includes the feedback indication via the SCell.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
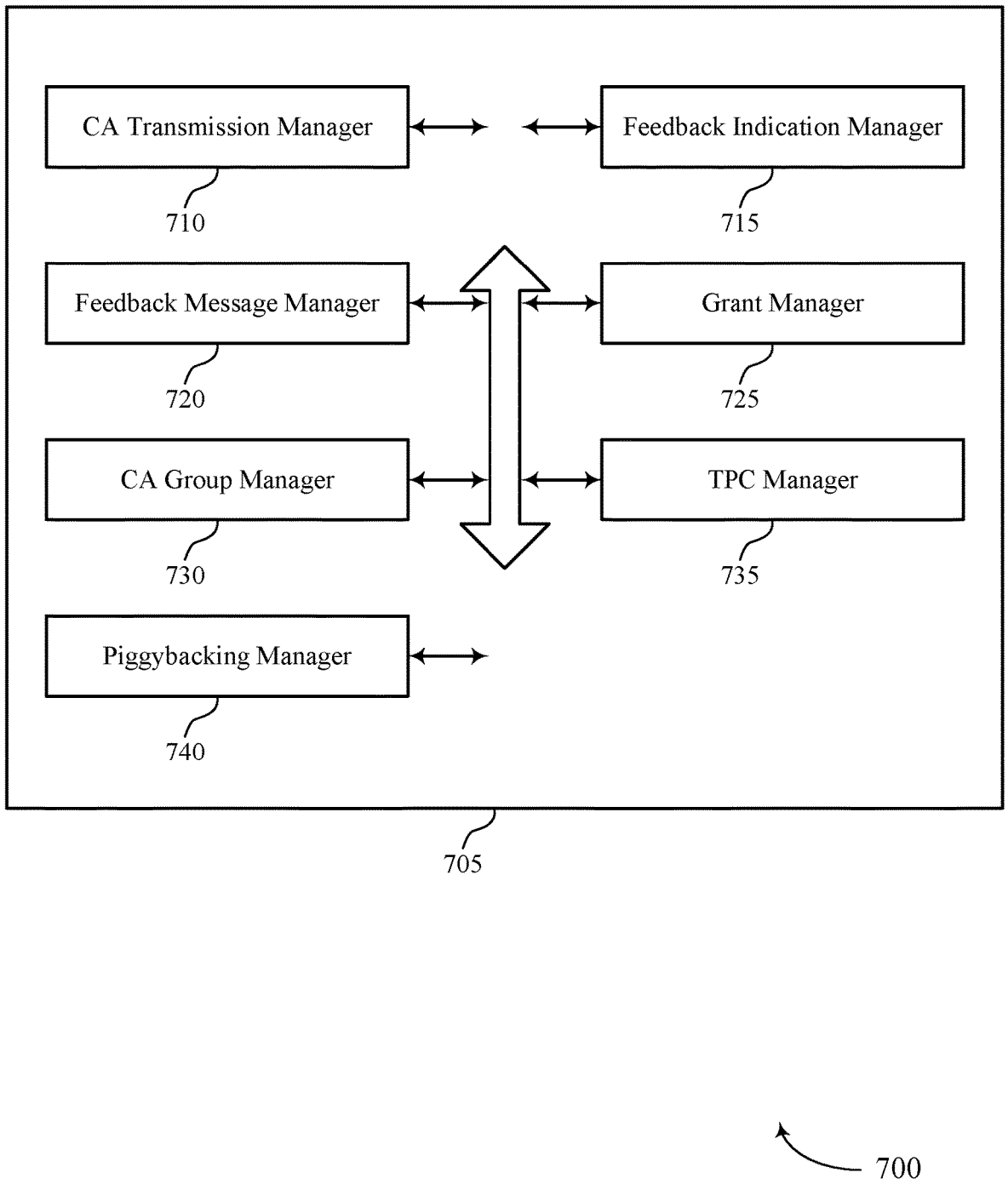
FIG. 7 shows a block diagram of a communications manager that supports parallel duplicated uplink control channels in uplink carrier aggregation in accordance with aspects of the present disclosure.

FIG. 7 shows a block diagram 700 of a communications manager 705 that supports parallel duplicated uplink control channels in uplink carrier aggregation in accordance with aspects of the present disclosure. The communications manager 705 may be an example of aspects of a communications manager 515, a communications manager 615, or a communications manager 810 described herein. The communications manager 705 may include a CA transmission manager 710, a feedback indication manager 715, a feedback message manager 720, a grant manager 725, a CA group manager 730, a TPC manager 735, and a piggybacking manager 740. Each of these modules may communicate, directly or indirectly, with one another (e.g., via one or more buses).

The CA transmission manager 710 may receive a downlink transmission via at least one of a PCell, a SCell, or a combination thereof.

The feedback indication manager 715 may identify a feedback indication for the downlink transmission.

The feedback message manager 720 may transmit a first feedback message that includes the feedback indication via the PCell. In some examples, the feedback message manager 720 may transmit a second feedback message that also includes the feedback indication via the SCell. In some examples, the feedback message manager 720 may transmit the first feedback message on a first component carrier simultaneously with transmitting the second feedback message on a second component carrier, wherein a first resource indication for the first feedback message is the same as or different than a second resource indication for the second feedback message. In some examples, the feedback message manager 720 may transmit the first feedback message on a first component carrier before transmitting the second feedback message on a second component carrier, wherein a first resource indication for the first feedback message is the same as or different than a second resource indication for the second feedback message.

The grant manager 725 may receive a grant scheduling the downlink transmission to the UE, the grant indicating that multi-cell uplink feedback message transmission is enabled for the downlink transmission. In some examples, the grant manager 725 may identify, based on the grant, that a first resource indication for transmission of the first feedback message and a second resource indication for transmission of the second feedback message are jointly indicated within the grant as a same resource indication. In some examples, the grant manager 725 may identify, based on the grant, that a first resource indication for transmission of the first feedback message and a second resource indication for transmission of the second feedback message are independently indicated within the grant as separate resource indications.

In some examples, the grant manager 725 may identify, based on the grant, a first resource for transmission of the first feedback message and a second resource for transmission of the second feedback message, where the first resource and the second resource are both for feedback message transmission within a same transmission time interval. In some examples, the grant manager 725 may identify, based on the grant, a first resource for transmission of the first feedback message and a second resource for transmission of the second feedback message, where the first resource and the second resource are for feedback message transmission within different transmission time intervals. In some cases, the grant includes a one-bit field to enable or disable the multi-cell uplink feedback message transmission. In some cases, the same resource indication includes at least a slot offset for transmission of the feedback indication relative to reception of the downlink transmission and a transmission resource for transmission of the feedback indication.

In some cases, the first resource indication and the second resource indication each include at least a respective slot offset for transmission of the feedback indication relative to reception of the downlink transmission and a respective transmission resource for transmission of the feedback indication. In some cases, the same transmission time interval is a one-symbol feedback transmission time interval.

The CA group manager 730 may receive a configuration signal configuring a PUCCH group that includes the PCell and the SCell. In some examples, the CA group manager 730 may identify, from the configuration signal, that the SCell is a supplemental PUCCH cell configured for the SCell to receive and the UE to transmit duplicate feedback for the PUCCH group. In some cases, the configuration signal includes a RRC signal.

The TPC manager 735 may receive a transmit power control command. In some examples, the TPC manager 735 may identify, based on the transmit power control command, a first power control for transmission of the first feedback message and a second power control for transmission of the second feedback message. In some examples, the TPC manager 735 may transmit power indicated by the transmit power control command is split between the first power control and the second power control in accordance with a default ratio.

In some examples, the TPC manager 735 may transmit power indicated by the transmit power control command is split between the first power control and the second power control in accordance with a configuration message received by the UE. In some examples, the TPC manager 735 may receive a first transmit power control command indicative of a first transmit power control for transmission of the first feedback message. In some examples, the TPC manager 735 may receive a second transmit power control command indicative of a second transmit power control for transmission of the second feedback message, where the first transmit power control command and the second transmit power control command are separate from each other.

The piggybacking manager 740 may identify that a first uplink data transmission is scheduled to overlap in time with one of the transmission of the first feedback message or the transmission of the second feedback message. In some examples, the piggybacking manager 740 may adhere to a feedback piggybacking rule in transmission of the first feedback message and transmission of the second feedback message, where the feedback piggybacking rule is that a supplemental feedback message is not multiplexed on a same uplink data transmission on which a primary feedback message is multiplexed. In some examples, the piggybacking manager 740 may multiplex the first feedback message with the first uplink data transmission without multiplexing the second feedback message with the first uplink data transmission. In some examples, the piggybacking manager 740 may multiplex the second feedback message with the first uplink data transmission without multiplexing the first feedback message with the first uplink data transmission.

Figure 8:
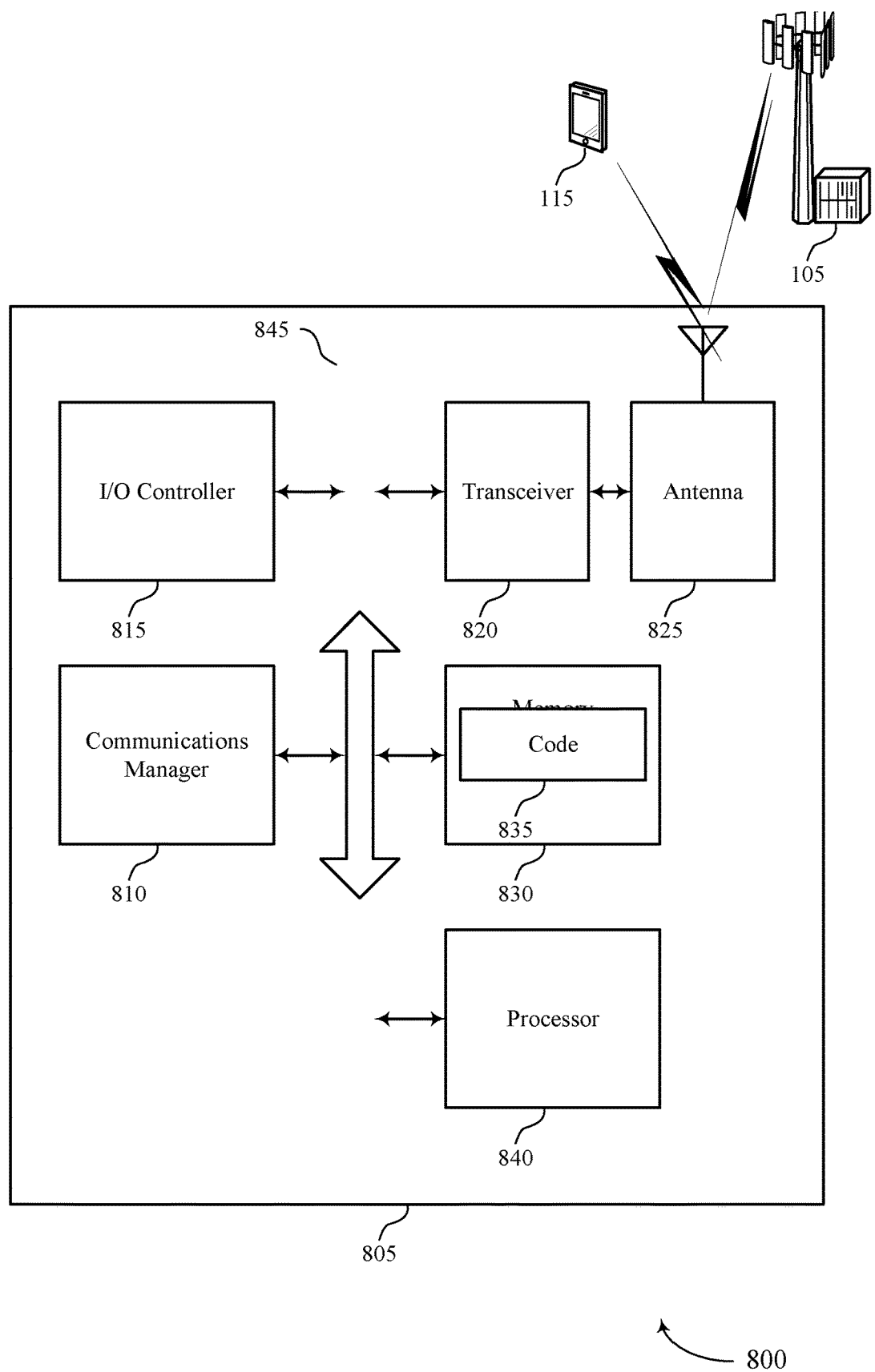
FIG. 8 shows a diagram of a system including a device that supports parallel duplicated uplink control channels in uplink carrier aggregation in accordance with aspects of the present disclosure.

FIG. 8 shows a diagram of a system 800 including a device 805 that supports parallel duplicated uplink control channels in uplink carrier aggregation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a downlink transmission via at least one of a PCell, a SCell, or a combination thereof, identify a feedback indication for the downlink transmission, transmit a first feedback message that includes the feedback indication via the PCell, and transmit a second feedback message that also includes the feedback indication via the SCell.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting parallel duplicated uplink control channels in uplink carrier aggregation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
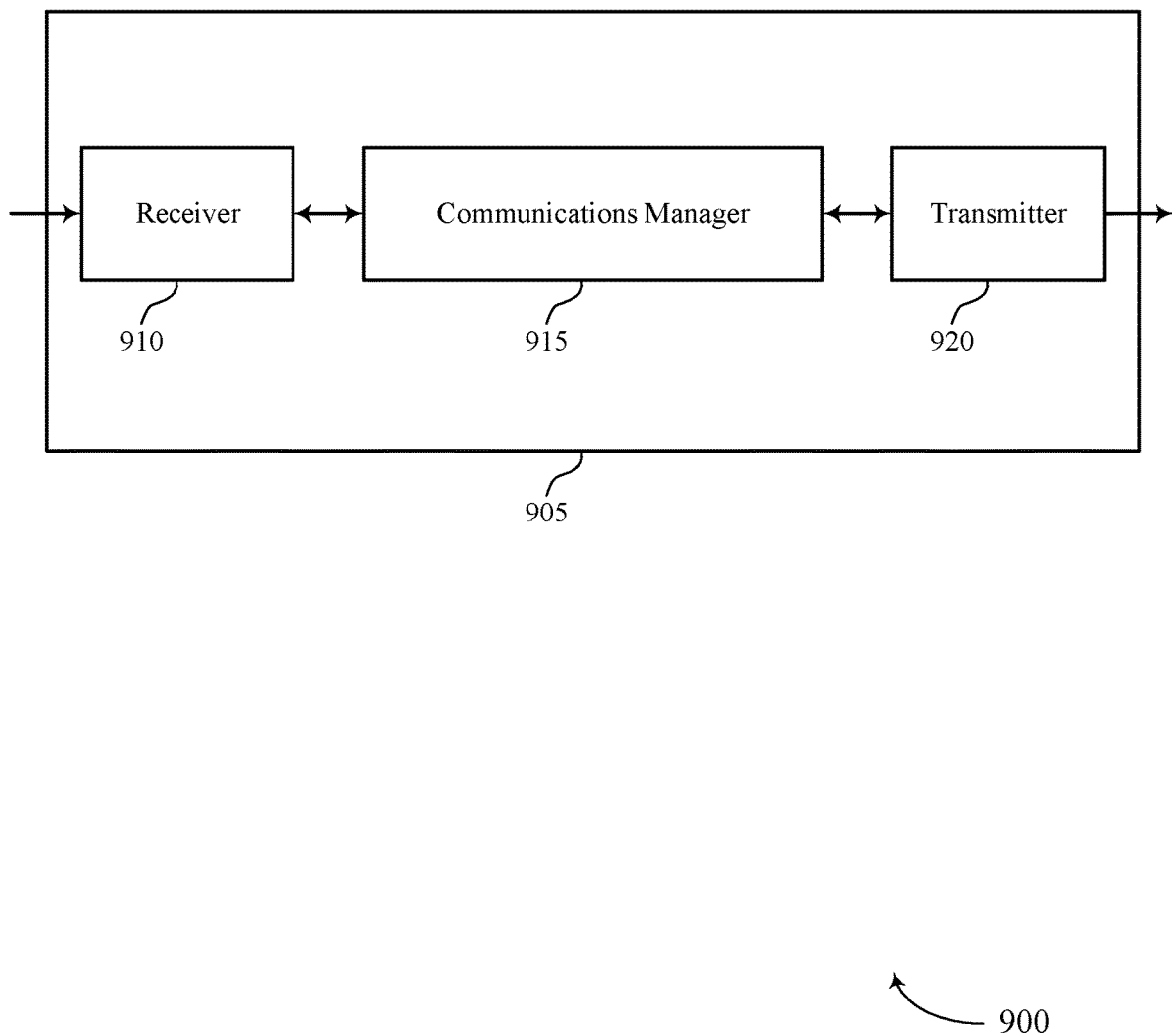
FIGS. 9 and 10 show block diagrams of devices that support parallel duplicated uplink control channels in uplink carrier aggregation in accordance with aspects of the present disclosure.

FIG. 9 shows a block diagram 900 of a device 905 that supports parallel duplicated uplink control channels in uplink carrier aggregation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to parallel duplicated uplink control channels in uplink carrier aggregation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
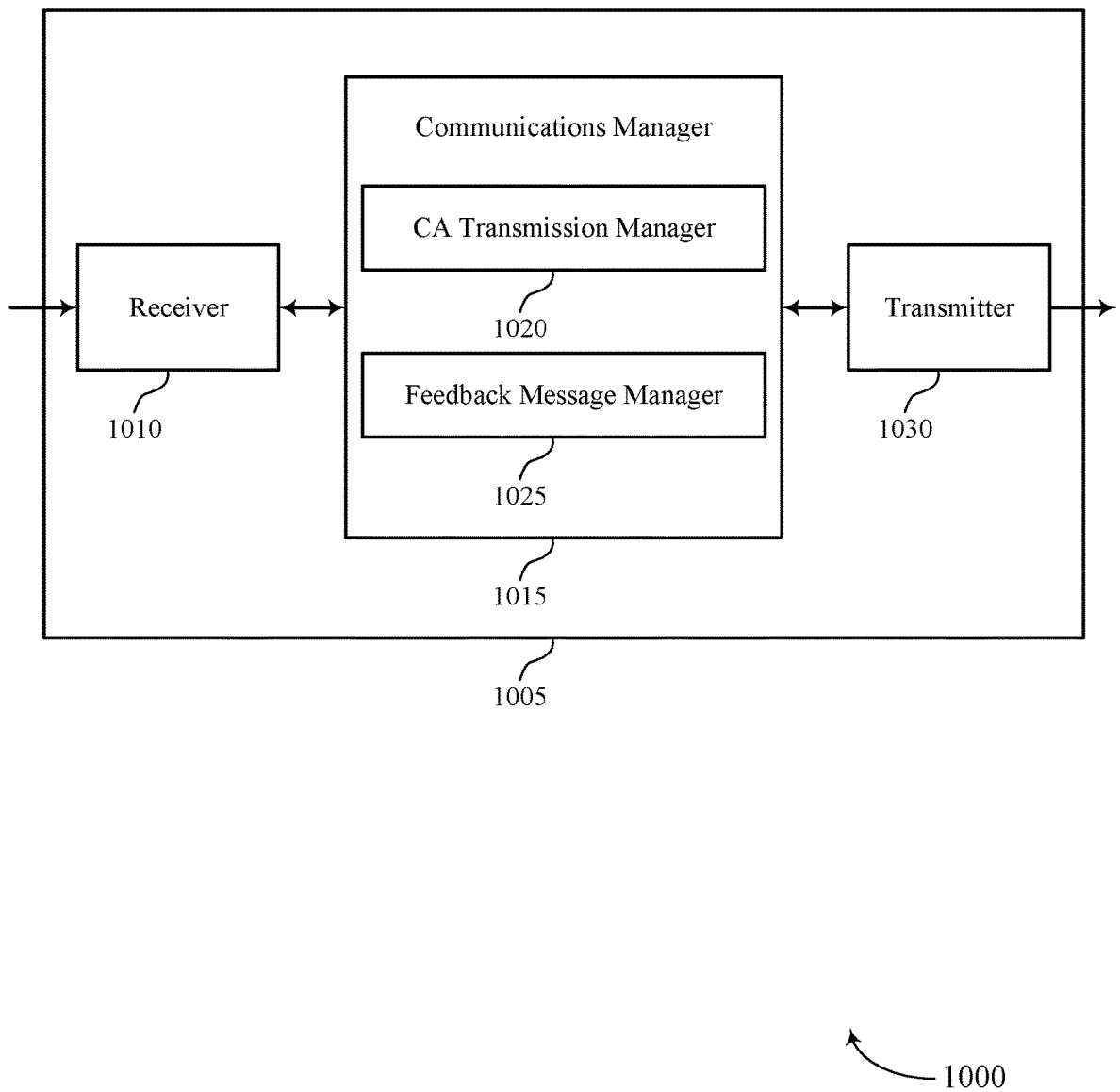

FIG. 10 shows a block diagram 1000 of a device 1005 that supports parallel duplicated uplink control channels in uplink carrier aggregation in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to parallel duplicated uplink control channels in uplink carrier aggregation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CA transmission manager 1020 and a feedback message manager 1025. The communications manager 1015 may be an example of aspects of the communications manager 1210 described herein.

The CA transmission manager 1020 may transmit a downlink transmission to a UE via at least one of a PCell, a SCell, or a combination thereof.

The feedback message manager 1025 may receive, via the PCell, a first feedback message that includes a feedback indication for the downlink transmission and receive, via the SCell, a second feedback message from the UE that also includes the feedback indication for the downlink transmission.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
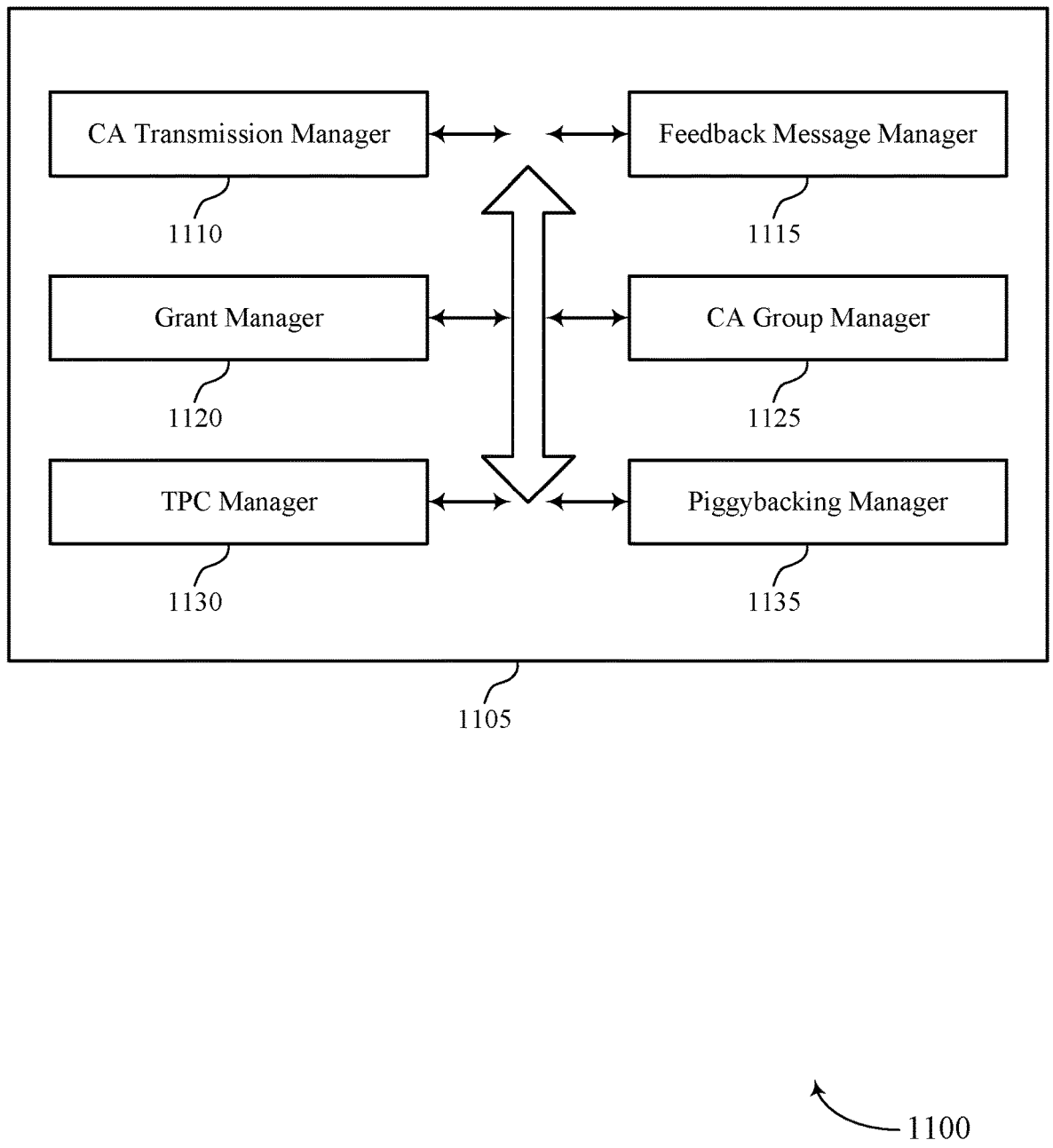
FIG. 11 shows a block diagram of a communications manager that supports parallel duplicated uplink control channels in uplink carrier aggregation in accordance with aspects of the present disclosure.

FIG. 11 shows a block diagram 1100 of a communications manager 1105 that supports parallel duplicated uplink control channels in uplink carrier aggregation in accordance with aspects of the present disclosure. The communications manager 1105 may be an example of aspects of a communications manager 915, a communications manager 1015, or a communications manager 1210 described herein. The communications manager 1105 may include a CA transmission manager 1110, a feedback message manager 1115, a grant manager 1120, a CA group manager 1125, a TPC manager 1130, and a piggybacking manager 1135. Each of these modules may communicate, directly or indirectly, with one another (e.g., via one or more buses).

The CA transmission manager 1110 may transmit a downlink transmission to a UE via at least one of a PCell, a SCell, or a combination thereof.

The feedback message manager 1115 may receive, via the PCell, a first feedback message that includes a feedback indication for the downlink transmission. In some examples, the feedback message manager 1115 may receive, via the SCell, a second feedback message from the UE that also includes the feedback indication for the downlink transmission. In some examples, the feedback message manager 1115 may receive the first feedback message on a first component carrier simultaneously with receiving the second feedback message on a second component carrier, wherein a first resource indication for the first feedback message is the same as or different than a second resource indication for the second feedback message. In some examples, the feedback message manager 1115 may receive the first feedback message on a first component carrier before receiving the second feedback message on a second component carrier, wherein a first resource indication for the first feedback message is the same as or different than a second resource indication for the second feedback message The grant manager 1120 may transmit a grant scheduling the downlink transmission to the UE, the grant indicating that multi-cell uplink feedback message transmission is enabled for the downlink transmission. In some examples, the grant manager 1120 may configure the grant to indicate a first resource indication for transmission of the first feedback message and a second resource indication for transmission of the second feedback message, where the first resource indication and second resource indication are jointly indicated within the grant as a same resource indication.

In some examples, the grant manager 1120 may configure the grant to indicate a first resource indication for transmission of the first feedback message and a second resource indication for transmission of the second feedback message, where the first resource indication and second resource indication are independently indicated within the grant as separate resource indications. In some examples, the grant manager 1120 may configure the grant to indicate a first resource for transmission of the first feedback message and a second resource for transmission of the second feedback message, where the first resource and the second resource are both for feedback message transmission within a same transmission time interval.

In some examples, the grant manager 1120 may configure the grant to indicate a first resource for transmission of the first feedback message and a second resource for transmission of the second feedback message, where the first resource and the second resource are for feedback message transmission within different transmission time intervals. In some cases, the grant includes a one-bit field to enable or disable the multi-cell uplink feedback message transmission. In some cases, the same resource indication includes at least a slot offset for reception of the feedback indication relative to transmission of the downlink transmission and a transmission resource for transmission of the feedback indication from the UE. In some cases, the first resource indication and the second resource indication each include at least a slot offset for reception of the feedback indication relative to transmission of the downlink transmission and a respective transmission resource for transmission of the feedback indication from the UE. In some cases, the same transmission time interval is a one-symbol feedback transmission time interval.

The CA group manager 1125 may transmit a configuration signal configuring a PUCCH group that includes the PCell and the SCell, where the configuration signal indicates that the SCell is a supplemental PUCCH cell configured for the SCell to receive and the UE to transmit duplicate feedback for the PUCCH group. In some cases, the configuration signal includes a RRC signal.

The TPC manager 1130 may transmit a transmit power control command that indicates a first power control for transmission of the first feedback message and a second power control for transmission of the second feedback message. In some examples, the TPC manager 1130 may transmit power indicated by the transmit power control command is split between the first power control and the second power control in accordance with a default ratio. In some examples, the TPC manager 1130 may transmit power indicated by the transmit power control command is split between the first power control and the second power control in accordance with a configuration message transmitted to the UE.

In some examples, the TPC manager 1130 may transmit a first transmit power control command indicative of a first transmit power control for transmission of the first feedback message. In some examples, the TPC manager 1130 may transmit a second transmit power control command indicative of a second transmit power control for transmission of the second feedback message, where the first transmit power control command and the second transmit power control command are separate from each other.

The piggybacking manager 1135 may receive a first uplink data transmission from the UE, where one of the first feedback message or the second feedback message is received multiplexed with the first uplink data transmission, and where another of the first feedback message or the second feedback message is received separate from the first uplink data transmission.

Figure 12:
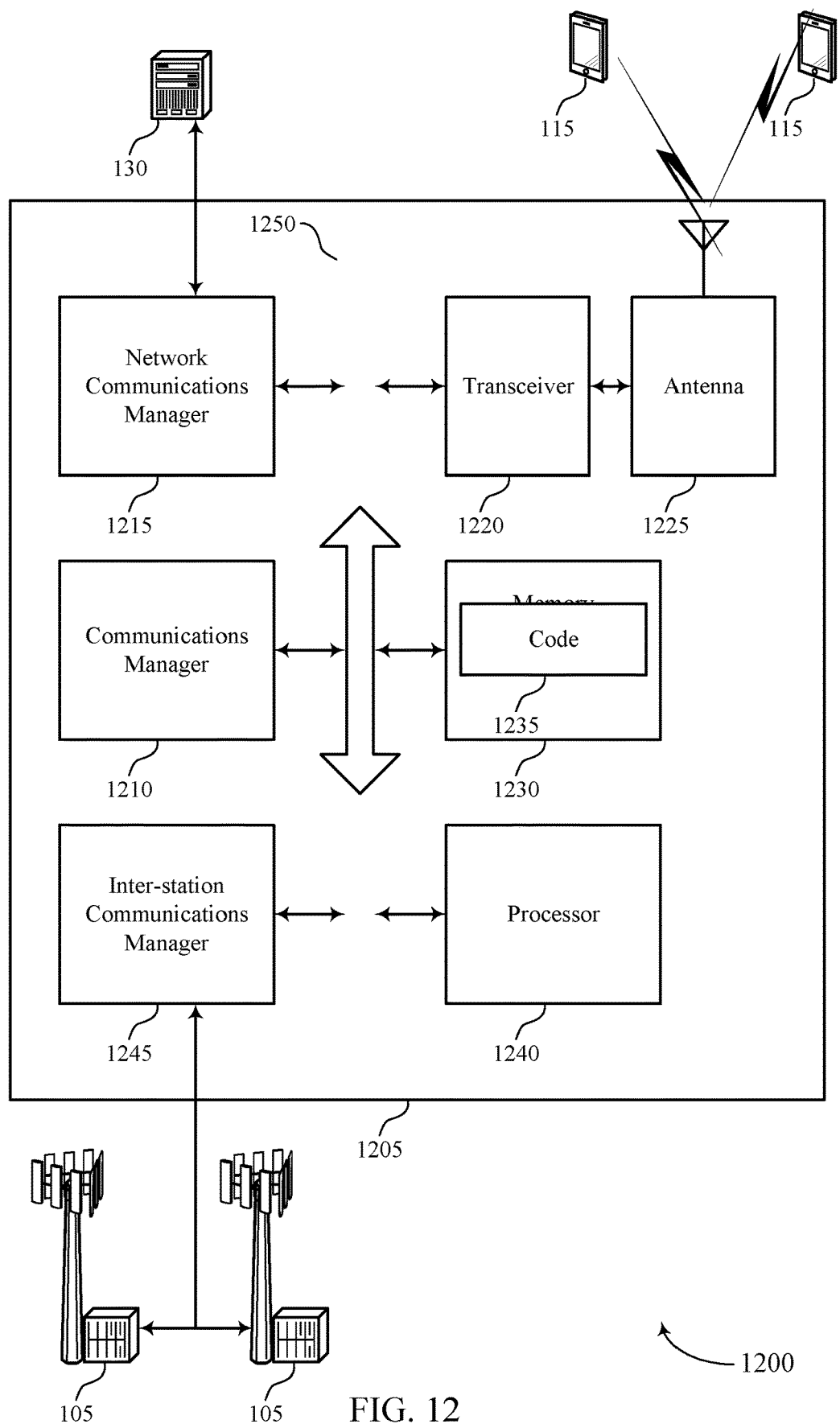
FIG. 12 shows a diagram of a system including a device that supports parallel duplicated uplink control channels in uplink carrier aggregation in accordance with aspects of the present disclosure.

FIG. 12 shows a diagram of a system 1200 including a device 1205 that supports parallel duplicated uplink control channels in uplink carrier aggregation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a downlink transmission to a UE via at least one of a PCell, a SCell, or a combination thereof, receive, via the PCell, a first feedback message that includes a feedback indication for the downlink transmission, and receive, via the SCell, a second feedback message from the UE that also includes the feedback indication for the downlink transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting parallel duplicated uplink control channels in uplink carrier aggregation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
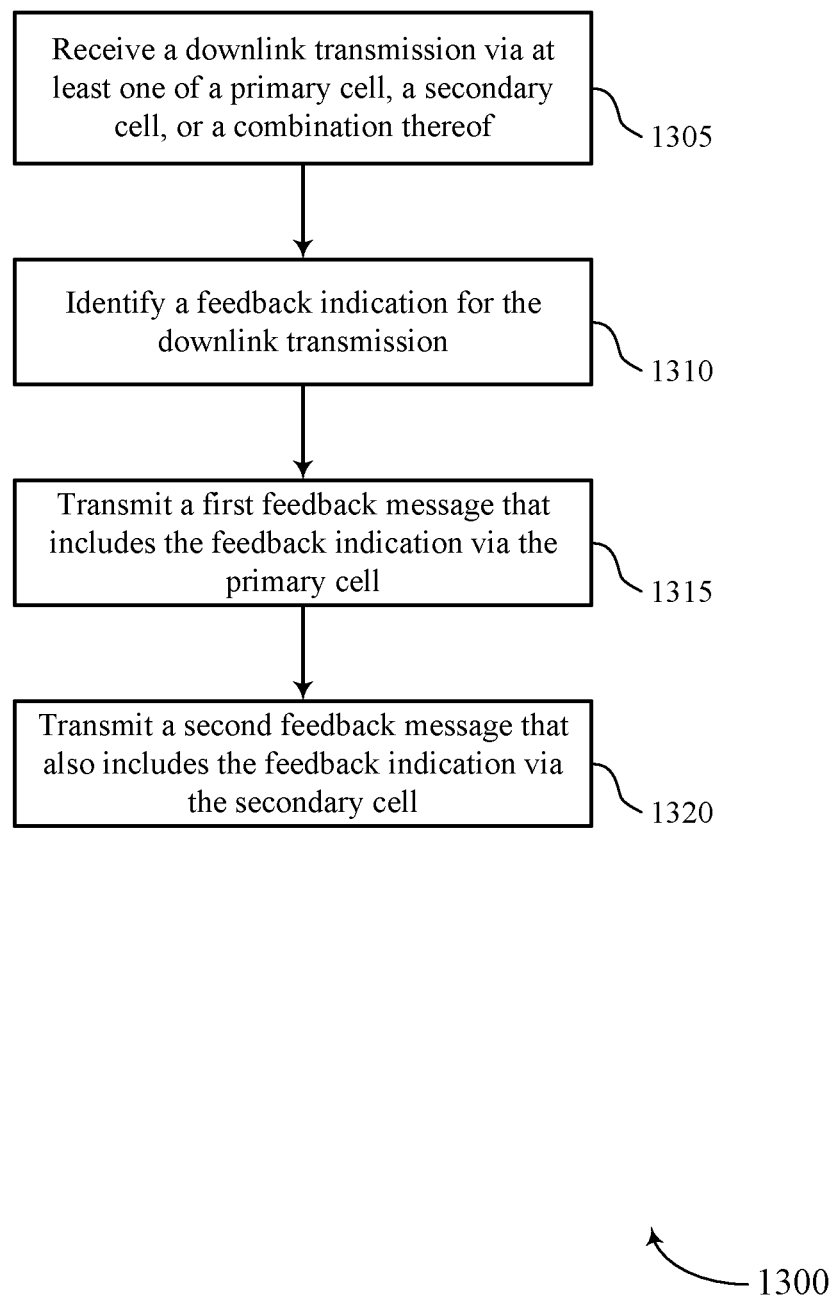
FIGS. 13 through 17 show flowcharts illustrating methods that support parallel duplicated uplink control channels in uplink carrier aggregation in accordance with aspects of the present disclosure.

FIG. 13 shows a flowchart illustrating a method 1300 that supports parallel duplicated uplink control channels in uplink carrier aggregation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a downlink transmission via at least one of a PCell, a SCell, or a combination thereof. The operations of 1305 may be performed according to the methods described herein. In some examples, aspects of the operations of 1305 may be performed by a CA transmission manager as described with reference to FIGS. 5 through 8.

At 1310, the UE may identify a feedback indication for the downlink transmission. The operations of 1310 may be performed according to the methods described herein. In some examples, aspects of the operations of 1310 may be performed by a feedback indication manager as described with reference to FIGS. 5 through 8.

At 1315, the UE may transmit a first feedback message that includes the feedback indication via the PCell. The operations of 1315 may be performed according to the methods described herein. In some examples, aspects of the operations of 1315 may be performed by a feedback message manager as described with reference to FIGS. 5 through 8.

At 1320, the UE may transmit a second feedback message that also includes the feedback indication via the SCell. The operations of 1320 may be performed according to the methods described herein. In some examples, aspects of the operations of 1320 may be performed by a feedback message manager as described with reference to FIGS. 5 through 8.

Figure 14:
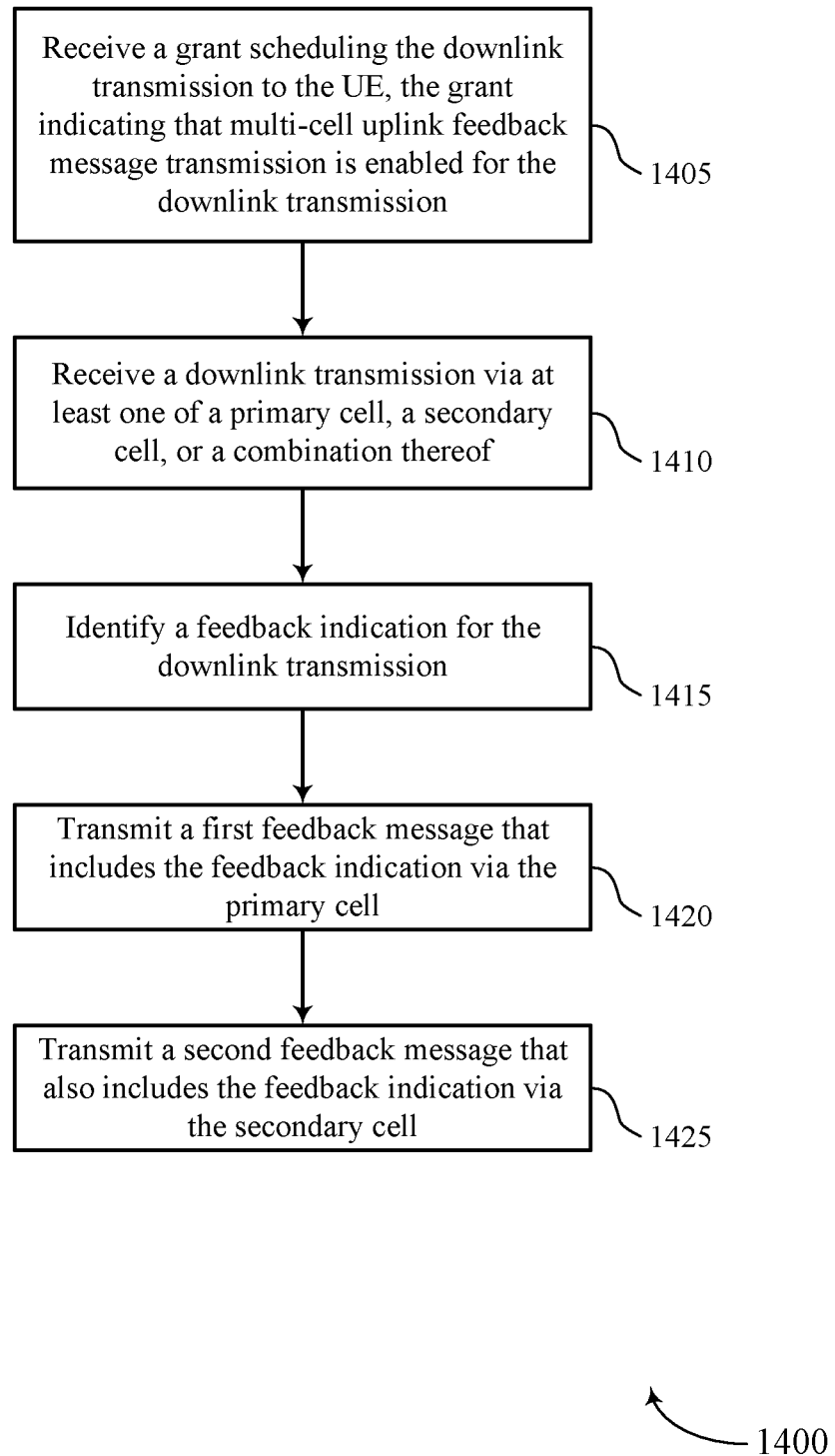

FIG. 14 shows a flowchart illustrating a method 1400 that supports parallel duplicated uplink control channels in uplink carrier aggregation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a grant scheduling the downlink transmission to the UE, the grant indicating that multi-cell uplink feedback message transmission is enabled for the downlink transmission. The operations of 1405 may be performed according to the methods described herein. In some examples, aspects of the operations of 1405 may be performed by a grant manager as described with reference to FIGS. 5 through 8.

At 1410, the UE may receive a downlink transmission via at least one of a PCell, a SCell, or a combination thereof. The operations of 1410 may be performed according to the methods described herein. In some examples, aspects of the operations of 1410 may be performed by a CA transmission manager as described with reference to FIGS. 5 through 8.

At 1415, the UE may identify a feedback indication for the downlink transmission. The operations of 1415 may be performed according to the methods described herein. In some examples, aspects of the operations of 1415 may be performed by a feedback indication manager as described with reference to FIGS. 5 through 8.

At 1420, the UE may transmit a first feedback message that includes the feedback indication via the PCell. The operations of 1420 may be performed according to the methods described herein. In some examples, aspects of the operations of 1420 may be performed by a feedback message manager as described with reference to FIGS. 5 through 8.

At 1425, the UE may transmit a second feedback message that also includes the feedback indication via the SCell. The operations of 1425 may be performed according to the methods described herein. In some examples, aspects of the operations of 1425 may be performed by a feedback message manager as described with reference to FIGS. 5 through 8.

Figure 15:
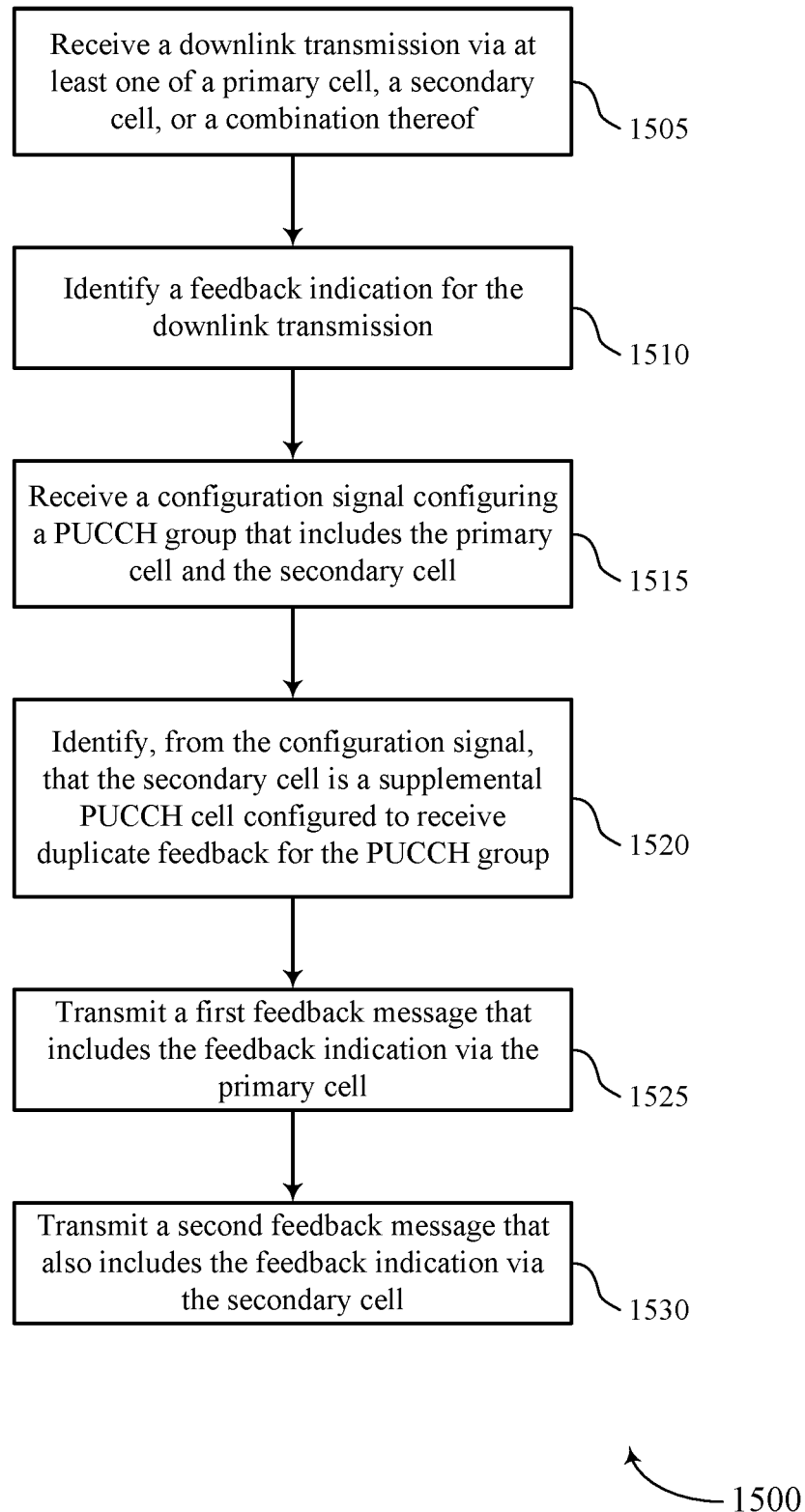

FIG. 15 shows a flowchart illustrating a method 1500 that supports parallel duplicated uplink control channels in uplink carrier aggregation in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a downlink transmission via at least one of a PCell, a SCell, or a combination thereof. The operations of 1505 may be performed according to the methods described herein. In some examples, aspects of the operations of 1505 may be performed by a CA transmission manager as described with reference to FIGS. 5 through 8.

At 1510, the UE may identify a feedback indication for the downlink transmission. The operations of 1510 may be performed according to the methods described herein. In some examples, aspects of the operations of 1510 may be performed by a feedback indication manager as described with reference to FIGS. 5 through 8.

At 1515, the UE may receive a configuration signal configuring a PUCCH group that includes the PCell and the SCell. The operations of 1515 may be performed according to the methods described herein. In some examples, aspects of the operations of 1515 may be performed by a CA group manager as described with reference to FIGS. 5 through 8.

At 1520, the UE may identify, from the configuration signal, that the SCell is a supplemental PUCCH cell configured for the SCell to receive and the UE to transmit duplicate feedback for the PUCCH group. The operations of 1520 may be performed according to the methods described herein. In some examples, aspects of the operations of 1520 may be performed by a CA group manager as described with reference to FIGS. 5 through 8.

At 1525, the UE may transmit a first feedback message that includes the feedback indication via the PCell. The operations of 1525 may be performed according to the methods described herein. In some examples, aspects of the operations of 1525 may be performed by a feedback message manager as described with reference to FIGS. 5 through 8.

At 1530, the UE may transmit a second feedback message that also includes the feedback indication via the SCell. The operations of 1530 may be performed according to the methods described herein. In some examples, aspects of the operations of 1530 may be performed by a feedback message manager as described with reference to FIGS. 5 through 8.

Figure 16:
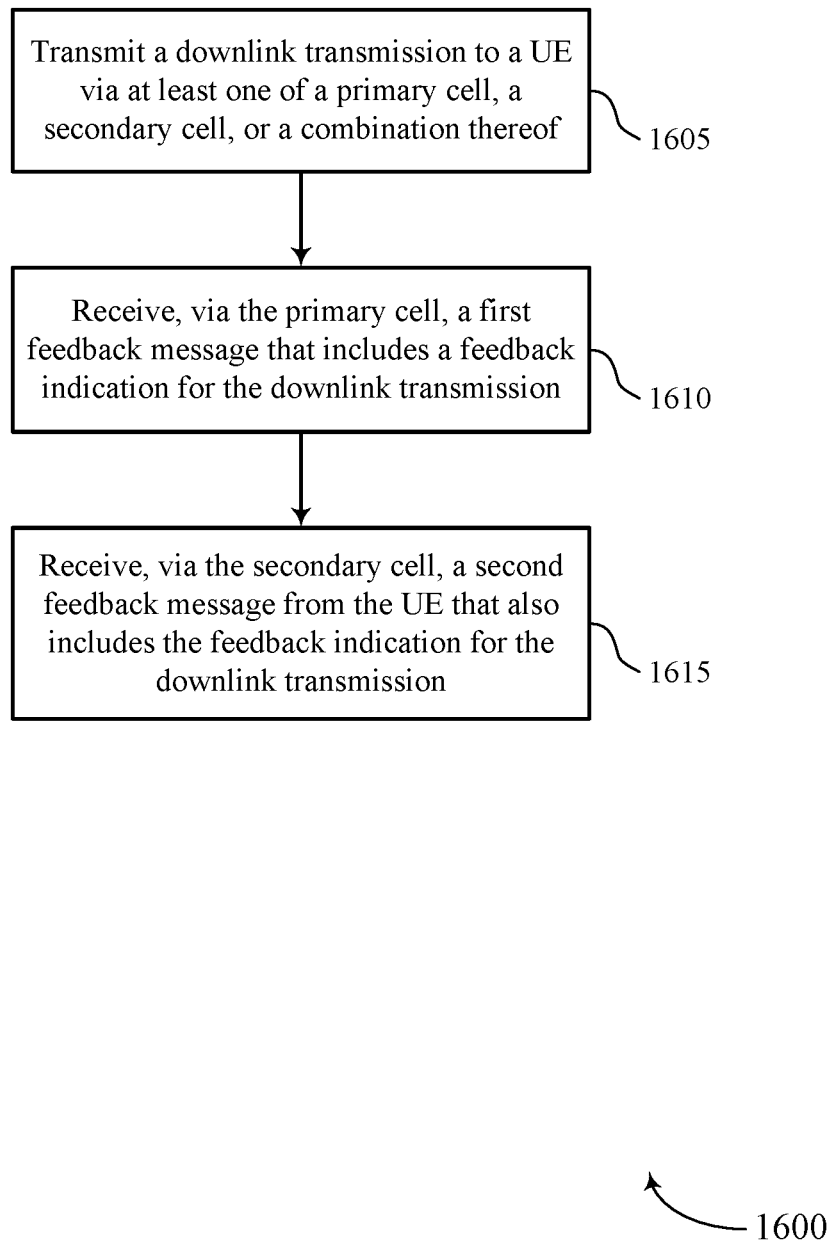

FIG. 16 shows a flowchart illustrating a method 1600 that supports parallel duplicated uplink control channels in uplink carrier aggregation in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a downlink transmission to a UE via at least one of a PCell, a SCell, or a combination thereof. The operations of 1605 may be performed according to the methods described herein. In some examples, aspects of the operations of 1605 may be performed by a CA transmission manager as described with reference to FIGS. 9 through 12.

At 1610, the base station may receive, via the PCell, a first feedback message that includes a feedback indication for the downlink transmission. The operations of 1610 may be performed according to the methods described herein. In some examples, aspects of the operations of 1610 may be performed by a feedback message manager as described with reference to FIGS. 9 through 12.

At 1615, the base station may receive, via the SCell, a second feedback message from the UE that also includes the feedback indication for the downlink transmission. The operations of 1615 may be performed according to the methods described herein. In some examples, aspects of the operations of 1615 may be performed by a feedback message manager as described with reference to FIGS. 9 through 12.

Figure 17:
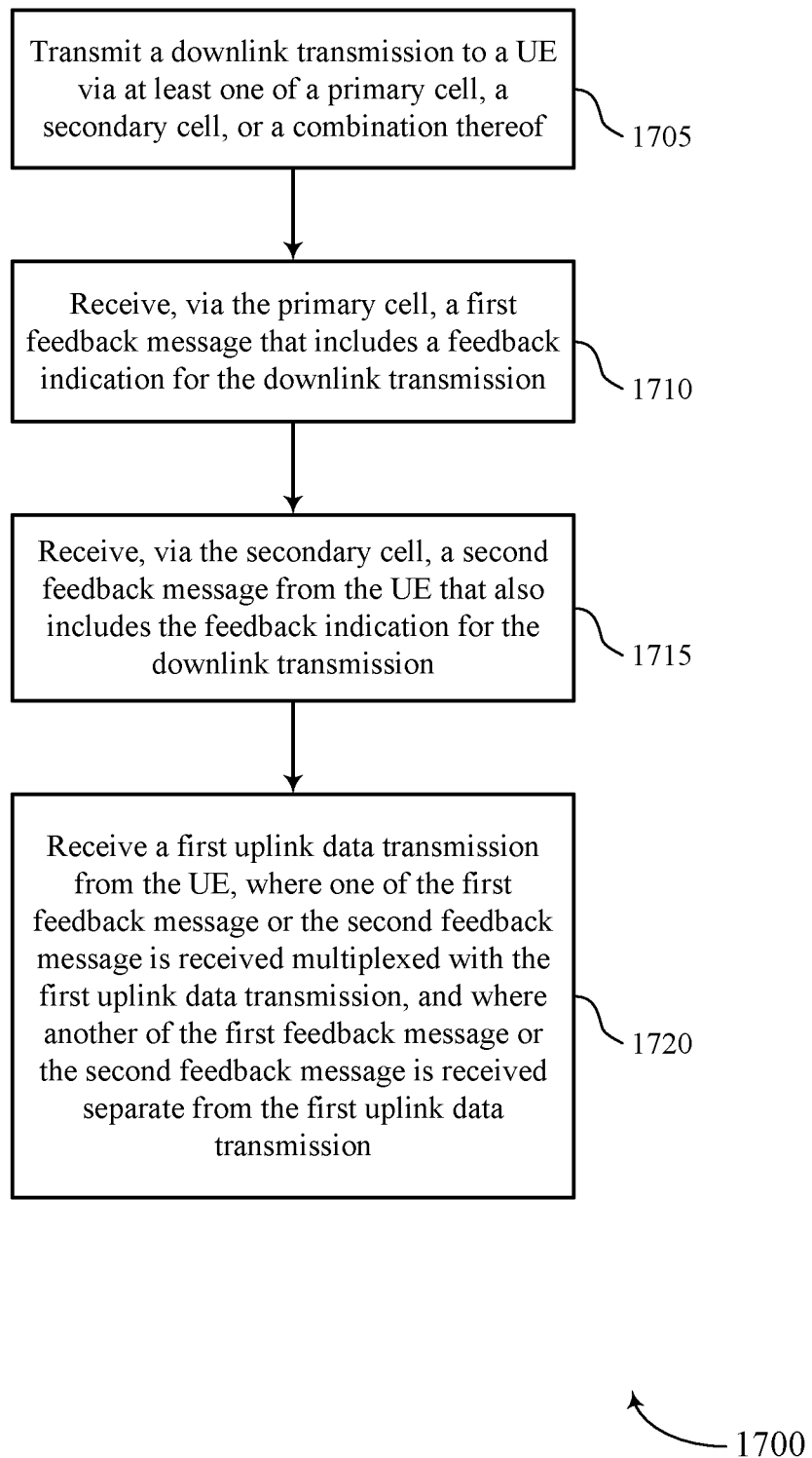

FIG. 17 shows a flowchart illustrating a method 1700 that supports parallel duplicated uplink control channels in uplink carrier aggregation in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit a downlink transmission to a UE via at least one of a PCell, a SCell, or a combination thereof. The operations of 1705 may be performed according to the methods described herein. In some examples, aspects of the operations of 1705 may be performed by a CA transmission manager as described with reference to FIGS. 9 through 12.

At 1710, the base station may receive, via the PCell, a first feedback message that includes a feedback indication for the downlink transmission. The operations of 1710 may be performed according to the methods described herein. In some examples, aspects of the operations of 1710 may be performed by a feedback message manager as described with reference to FIGS. 9 through 12.

At 1715, the base station may receive, via the SCell, a second feedback message from the UE that also includes the feedback indication for the downlink transmission. The operations of 1715 may be performed according to the methods described herein. In some examples, aspects of the operations of 1715 may be performed by a feedback message manager as described with reference to FIGS. 9 through 12.

At 1720, the base station may receive a first uplink data transmission from the UE, where one of the first feedback message or the second feedback message is received multiplexed with the first uplink data transmission, and where another of the first feedback message or the second feedback message is received separate from the first uplink data transmission. The operations of 1720 may be performed according to the methods described herein. In some examples, aspects of the operations of 1720 may be performed by a piggybacking manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving network signaling enabling or disabling multi-cell uplink feedback message transmission for a downlink transmission;
    receiving the downlink transmission via at least one of a primary cell, a secondary cell, or a combination thereof;
    identifying a feedback indication for the downlink transmission;
    transmitting a first feedback message that includes the feedback indication via the primary cell; and
    transmitting a second feedback message that also includes the feedback indication via the secondary cell based at least in part on the network signaling enabling multi-cell uplink feedback message transmission.

2. The method of claim 1, wherein receiving the network signaling comprises:
    receiving a grant scheduling the downlink transmission to the UE, the grant indicating that multi-cell uplink feedback message transmission is enabled for the downlink transmission.

3. The method of claim 2, further comprising:
    identifying, based at least in part on the grant, that a first resource indication for transmission of the first feedback message and a second resource indication for transmission of the second feedback message are jointly indicated within the grant as a same resource indication.

4. The method of claim 3, wherein the grant includes a one-bit field to enable or disable multi-cell uplink feedback message transmission.

5. The method of claim 3, wherein the same resource indication includes at least a slot offset for transmission of the feedback indication relative to reception of the downlink transmission and a transmission resource for transmission of the feedback indication.

6. The method of claim 2, further comprising:
    identifying, based at least in part on the grant, that a first resource indication for transmission of the first feedback message and a second resource indication for transmission of the second feedback message are independently indicated within the grant as separate resource indications.

7. The method of claim 6, wherein the first resource indication and the second resource indication each include at least a respective slot offset for transmission of the feedback indication relative to reception of the downlink transmission and a respective transmission resource for transmission of the feedback indication.

8. The method of claim 2, further comprising:
    identifying, based at least in part on the grant, a first resource for transmission of the first feedback message and a second resource for transmission of the second feedback message, wherein the first resource and the second resource are both for feedback message transmission within a same transmission time interval.

9. The method of claim 2, further comprising:
    identifying, based at least in part on the grant, a first resource for transmission of the first feedback message and a second resource for transmission of the second feedback message, wherein the first resource and the second resource are for feedback message transmission within different transmission time intervals.

10. The method of claim 1, wherein receiving the network signaling comprises:
receiving a configuration signal configuring a physical uplink control channel (PUCCH) group that includes the primary cell and the secondary cell; and
identifying, from the configuration signal, that the secondary cell is a supplemental PUCCH cell configured for the secondary cell to receive and the UE to transmit duplicate feedback for the PUCCH group.

11. The method of claim 10, wherein the configuration signal comprises a radio resource control (RRC) signal.

12. The method of claim 1, further comprising:
receiving a transmit power control command; and
identifying, based at least in part on the transmit power control command, a first power control for transmission of the first feedback message and a second power control for transmission of the second feedback message.

13. The method of claim 12, wherein:
transmit power indicated by the transmit power control command is split between the first power control and the second power control in accordance with a default ratio.

14. The method of claim 12, wherein:
transmit power indicated by the transmit power control command is split between the first power control and the second power control in accordance with a configuration message received by the UE.

15. The method of claim 1, further comprising:
receiving a first transmit power control command indicative of a first transmit power control for transmission of the first feedback message; and
receiving a second transmit power control command indicative of a second transmit power control for transmission of the second feedback message, wherein the first transmit power control command and the second transmit power control command are separate from each other.

16. The method of claim 1, further comprising:
identifying that a first uplink data transmission is scheduled to overlap in time with one of the transmission of the first feedback message or the transmission of the second feedback message; and
adhering to a feedback piggybacking rule in transmission of the first feedback message and transmission of the second feedback message, wherein the feedback piggybacking rule is that a supplemental feedback message is not multiplexed on a same uplink data transmission on which a primary feedback message is multiplexed.

17. The method of claim 16, wherein the first uplink data transmission overlaps in time with transmission of the first feedback message but not with transmission of the second feedback message, and wherein adhering to the feedback piggybacking rule comprises:
multiplexing the first feedback message with the first uplink data transmission without multiplexing the second feedback message with the first uplink data transmission.

18. The method of claim 16, wherein the first uplink data transmission overlaps in time with transmission of the second feedback message but not with transmission of the first feedback message, and wherein adhering to the feedback piggybacking rule comprises:
multiplexing the second feedback message with the first uplink data transmission without multiplexing the first feedback message with the first uplink data transmission.

19. The method of claim 1, further comprising:
transmitting the first feedback message on a first component carrier simultaneously with transmitting the second feedback message on a second component carrier, wherein a first resource indication for the first feedback message is the same as or different than a second resource indication for the second feedback message.

20. The method of claim 1, further comprising:
transmitting the first feedback message on a first component carrier before transmitting the second feedback message on a second component carrier, wherein a first resource indication for the first feedback message is the same as or different than a second resource indication for the second feedback message.

21. The method of claim 1, wherein the network signaling includes a one-bit field to enable or disable multi-cell uplink feedback message transmission.

22. A method for wireless communication at a network device, comprising:
transmitting, to a user equipment (UE), network signaling enabling or disabling multi-cell uplink feedback message transmission for a downlink transmission;
transmitting the downlink transmission to the UE via at least one of a primary cell, a secondary cell, or a combination thereof;
receiving, via the primary cell, a first feedback message that includes a feedback indication for the downlink transmission; and
receiving, via the secondary cell, a second feedback message from the UE that also includes the feedback indication for the downlink transmission based at least in part on the network signaling enabling multi-cell uplink feedback message transmission.

23. The method of claim 22, wherein transmitting the network signaling comprises:
transmitting a grant scheduling the downlink transmission to the UE, the grant indicating that multi-cell uplink feedback message transmission is enabled for the downlink transmission.

24. The method of claim 23, further comprising:
configuring the grant to indicate a first resource indication for transmission of the first feedback message and a second resource indication for transmission of the second feedback message, wherein the first resource indication and second resource indication are jointly indicated within the grant as a same resource indication.

25. The method of claim 24, wherein the grant includes a one-bit field to enable or disable multi-cell uplink feedback message transmission.

26. The method of claim 24, wherein the same resource indication includes at least a slot offset for reception of the feedback indication relative to transmission of the downlink transmission and a transmission resource for transmission of the feedback indication from the UE.

27. The method of claim 23, further comprising:
configuring the grant to indicate a first resource indication for transmission of the first feedback message and a second resource indication for transmission of the second feedback message, wherein the first resource indication and second resource indication are independently indicated within the grant as separate resource indications.

28. The method of claim 27, wherein the first resource indication and the second resource indication each include at least a slot offset for reception of the feedback indication relative to transmission of the downlink transmission and a respective transmission resource for transmission of the feedback indication from the UE.

29. An apparatus for wireless communication at a user equipment (UE), comprising:
a processor,
memory coupled with the processor; and
instructions stored in the memory and executable by the processor to cause the apparatus to:
receive network signaling enabling or disabling multi-cell uplink feedback message transmission for a downlink transmission;
receive the downlink transmission via at least one of a primary cell, a secondary cell, or a combination thereof;
identify a feedback indication for the downlink transmission;
transmit a first feedback message that includes the feedback indication via the primary cell; and
transmit a second feedback message that also includes the feedback indication via the secondary cell based at least in part on the network signaling enabling multi-cell uplink feedback message transmission.

30. An apparatus for wireless communication at a network device, comprising:
a processor,
memory coupled with the processor; and
instructions stored in the memory and executable by the processor to cause the apparatus to:
transmit, to a user equipment (UE), network signaling enabling or disabling multi-cell uplink feedback message transmission for a downlink transmission;
transmit the downlink transmission to the UE via at least one of a primary cell, a secondary cell, or a combination thereof;
receive, via the primary cell, a first feedback message that includes a feedback indication for the downlink transmission; and
receive, via the secondary cell, a second feedback message from the UE that also includes the feedback indication for the downlink transmission based at least in part on the network signaling enabling multi-cell uplink feedback message transmission.

* * * * *